Dec. 8, 1936.      F. A. HART      2,063,737
COMBINED TYPEWRITING AND COMPUTING MACHINE
Filed Jan. 24, 1931      14 Sheets-Sheet 1

WITNESSES
Grace V. Talbott
Charles O. Smith

INVENTOR
Frederick A. Hart
BY Robert H. Strother
ATTORNEY

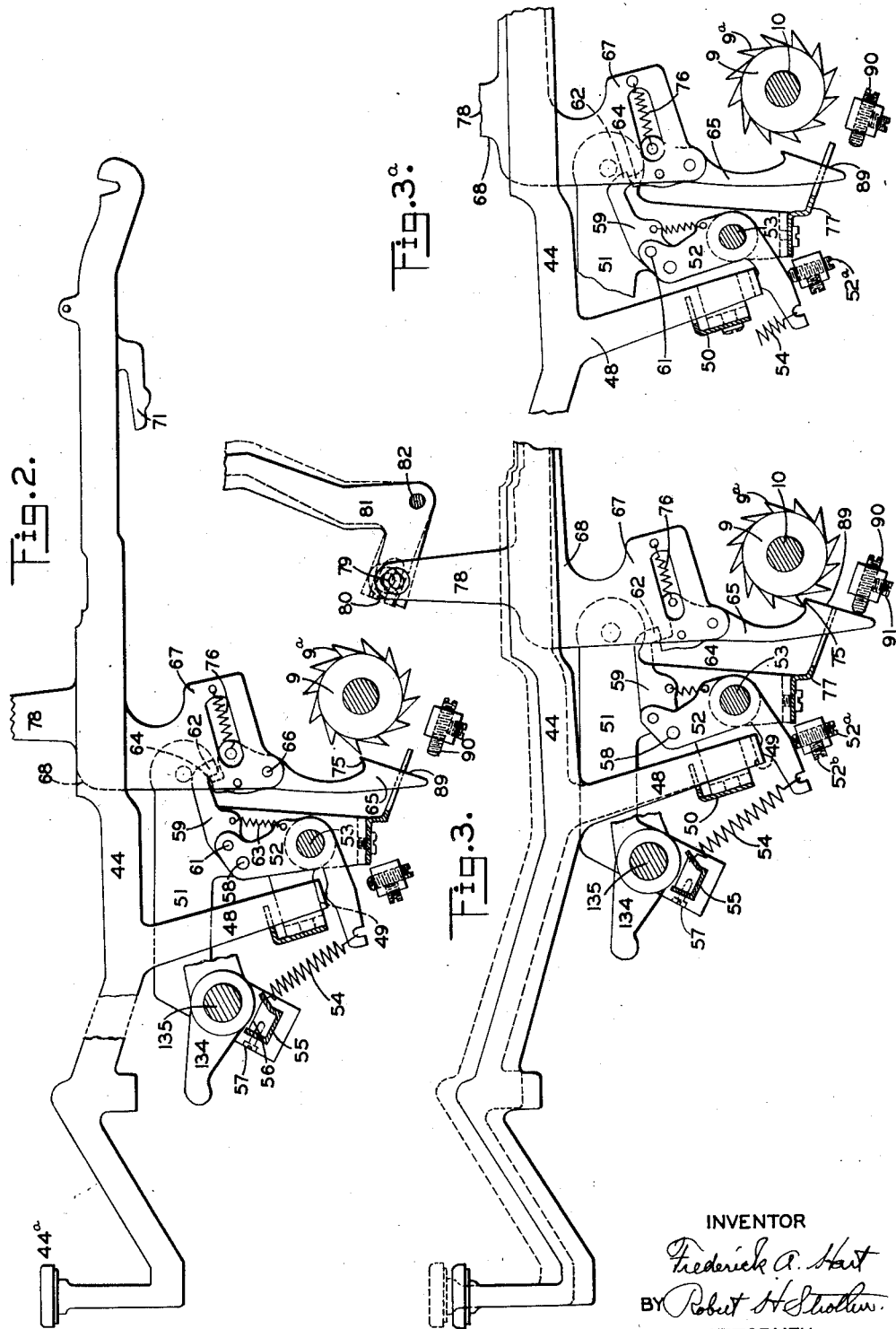

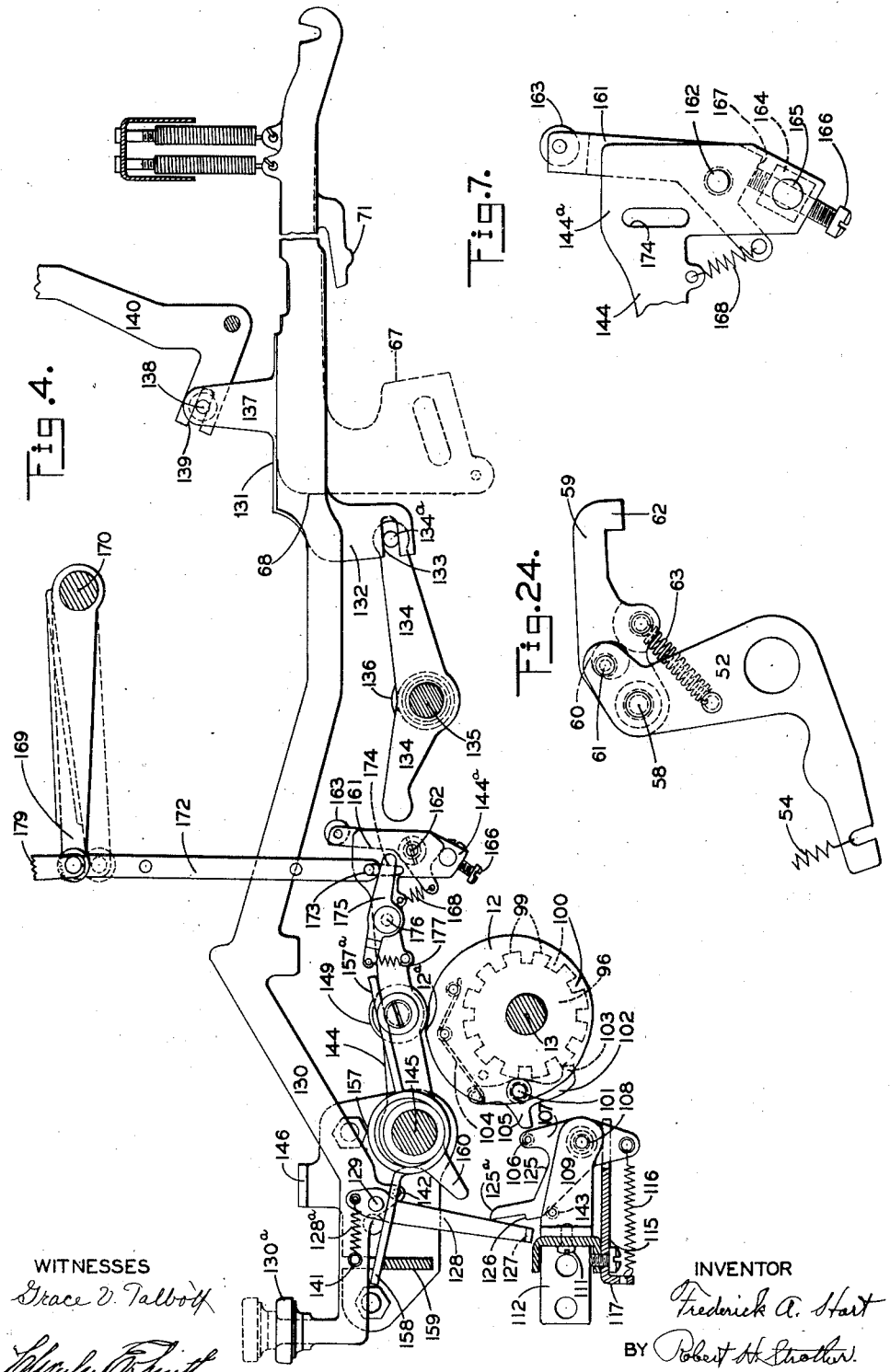

Dec. 8, 1936.    F. A. HART    2,063,737
COMBINED TYPEWRITING AND COMPUTING MACHINE
Filed Jan. 24, 1931    14 Sheets-Sheet 4
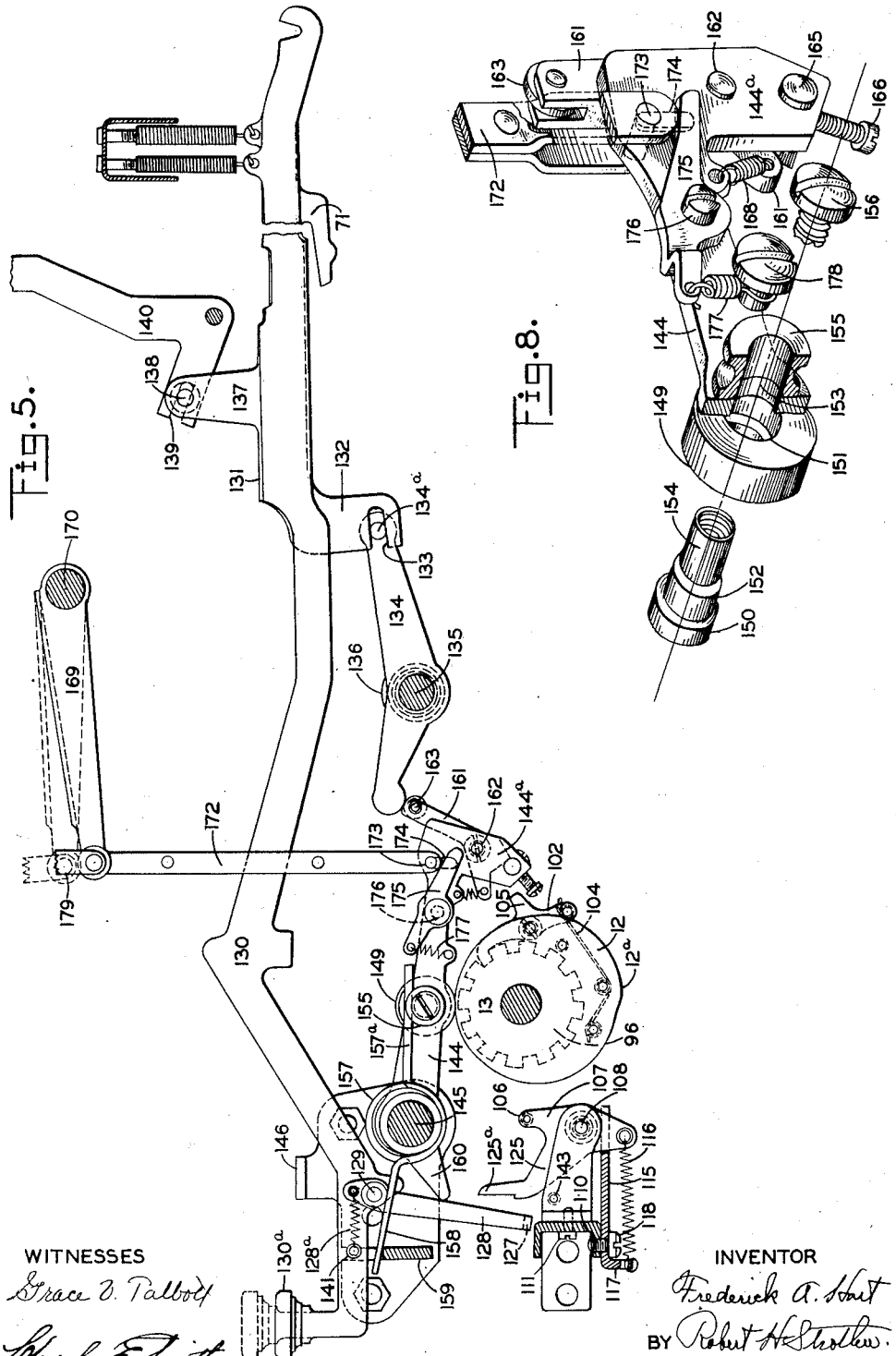
WITNESSES
Grace V. Talbot
Charles E. Smith
INVENTOR
Frederick A. Hart
BY Robert H. Strother
ATTORNEY

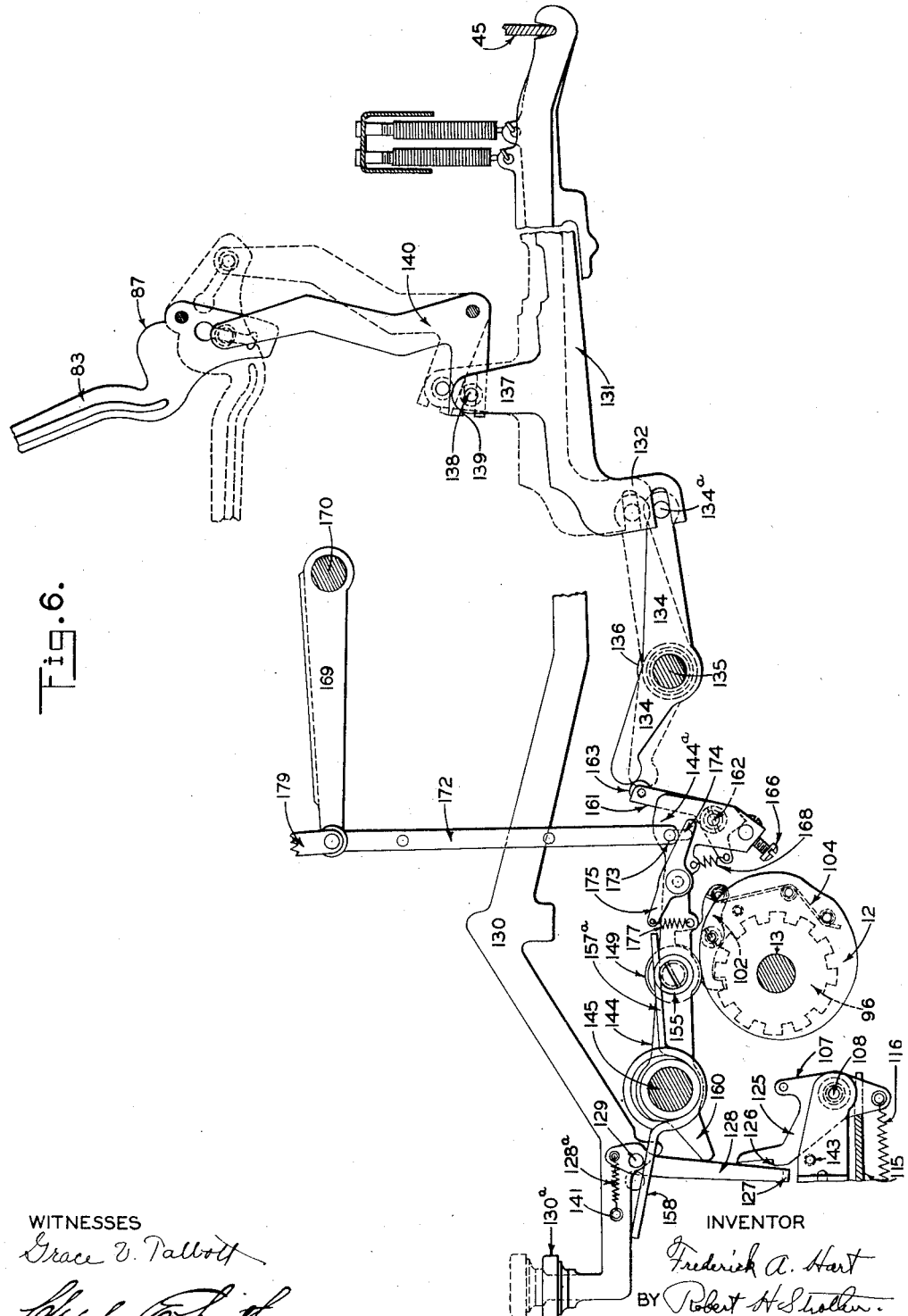

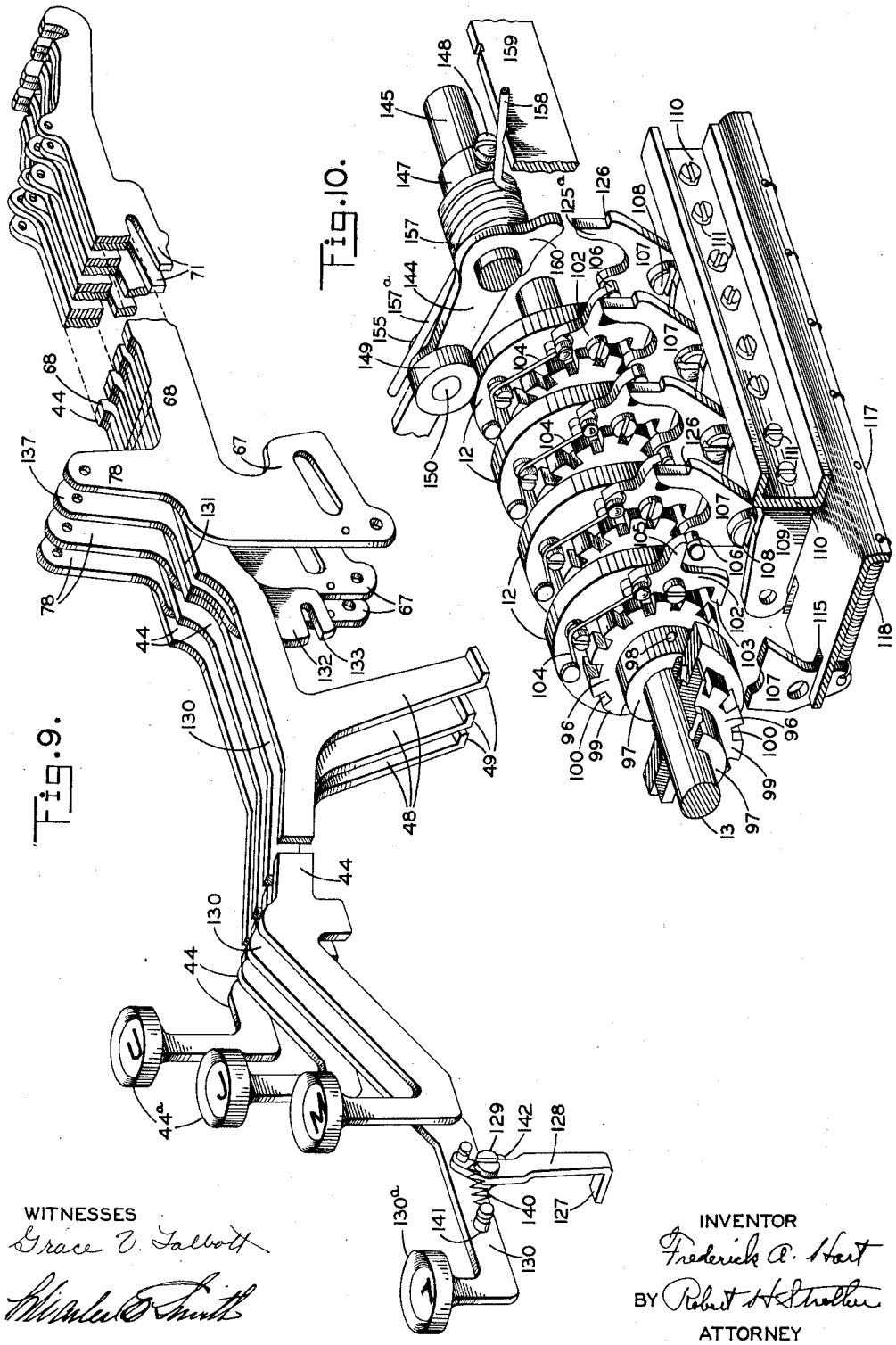

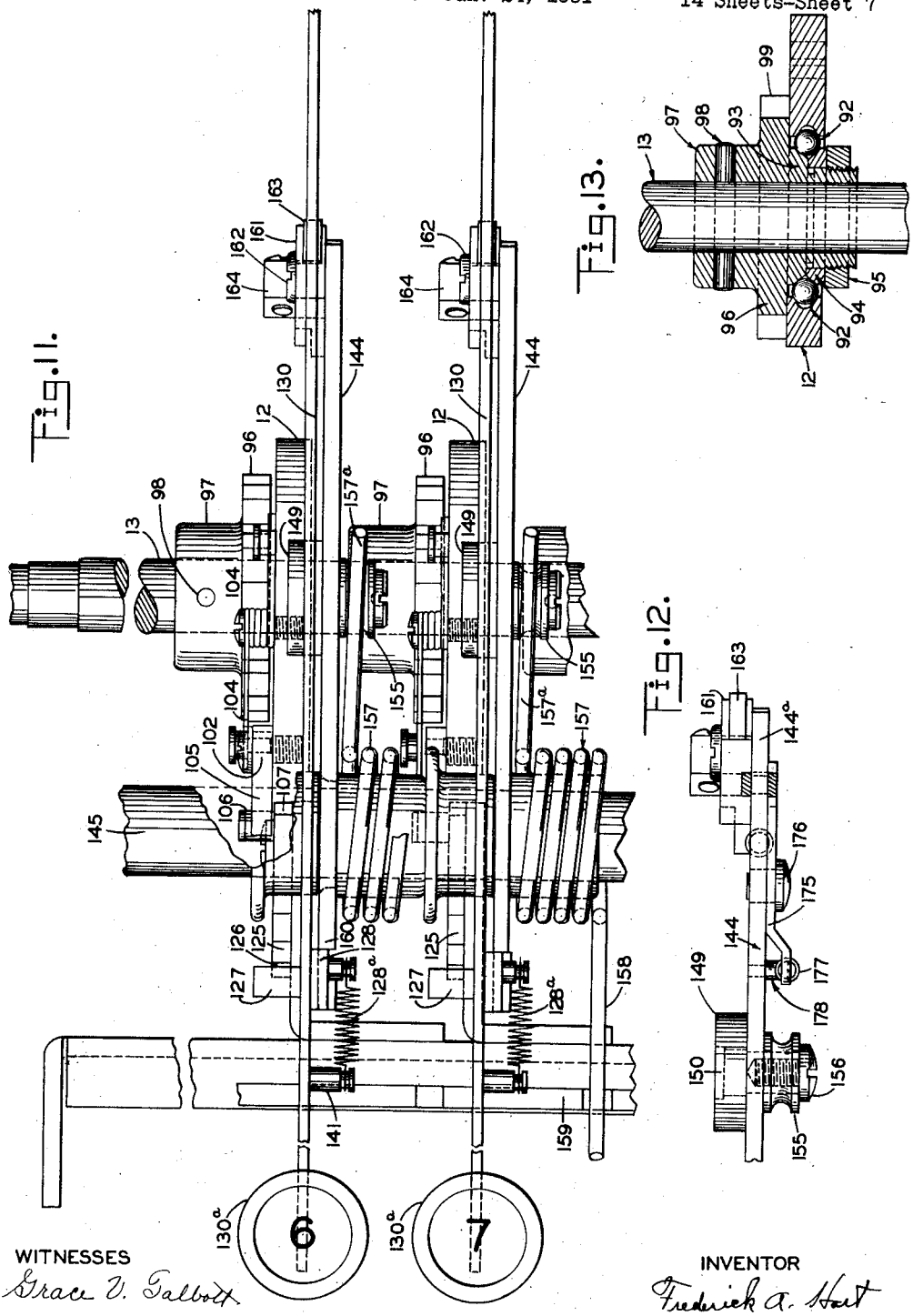

Dec. 8, 1936.  F. A. HART  2,063,737
COMBINED TYPEWRITING AND COMPUTING MACHINE
Filed Jan. 24, 1931  14 Sheets-Sheet 8
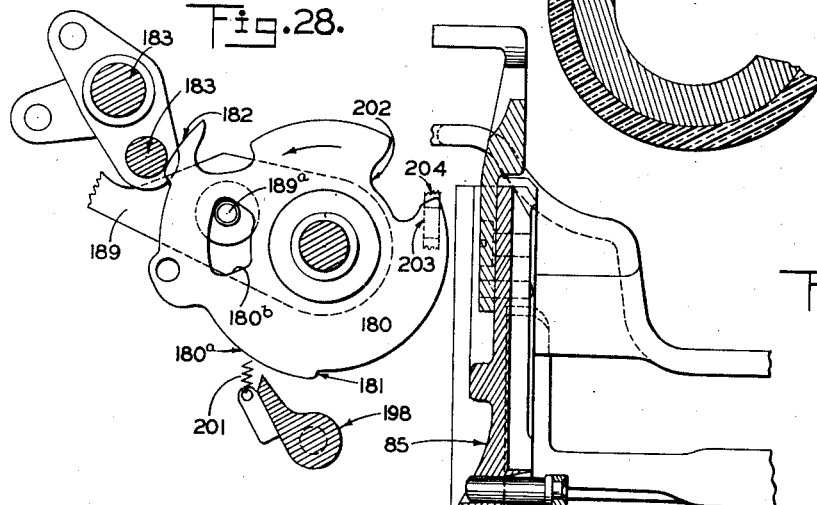
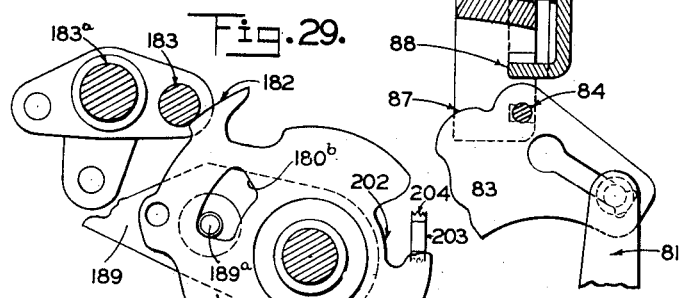
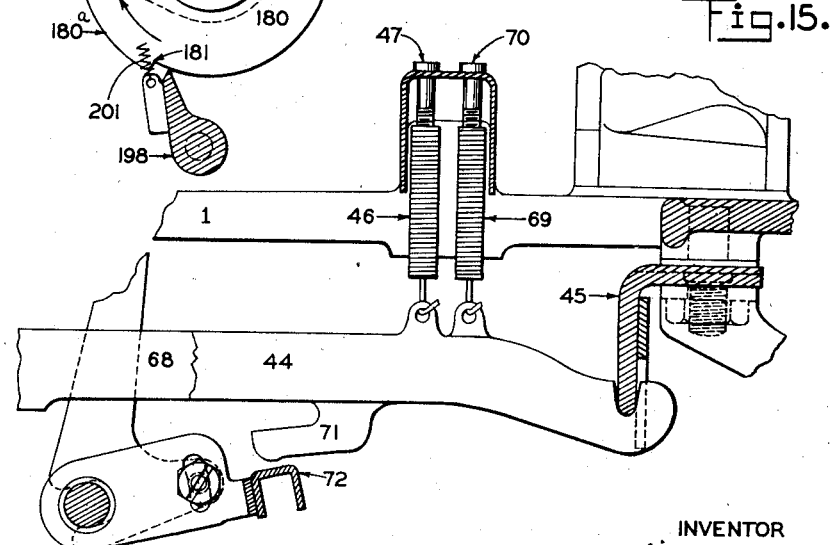
INVENTOR
Frederick A. Hart
BY Robert H. Strother
ATTORNEY

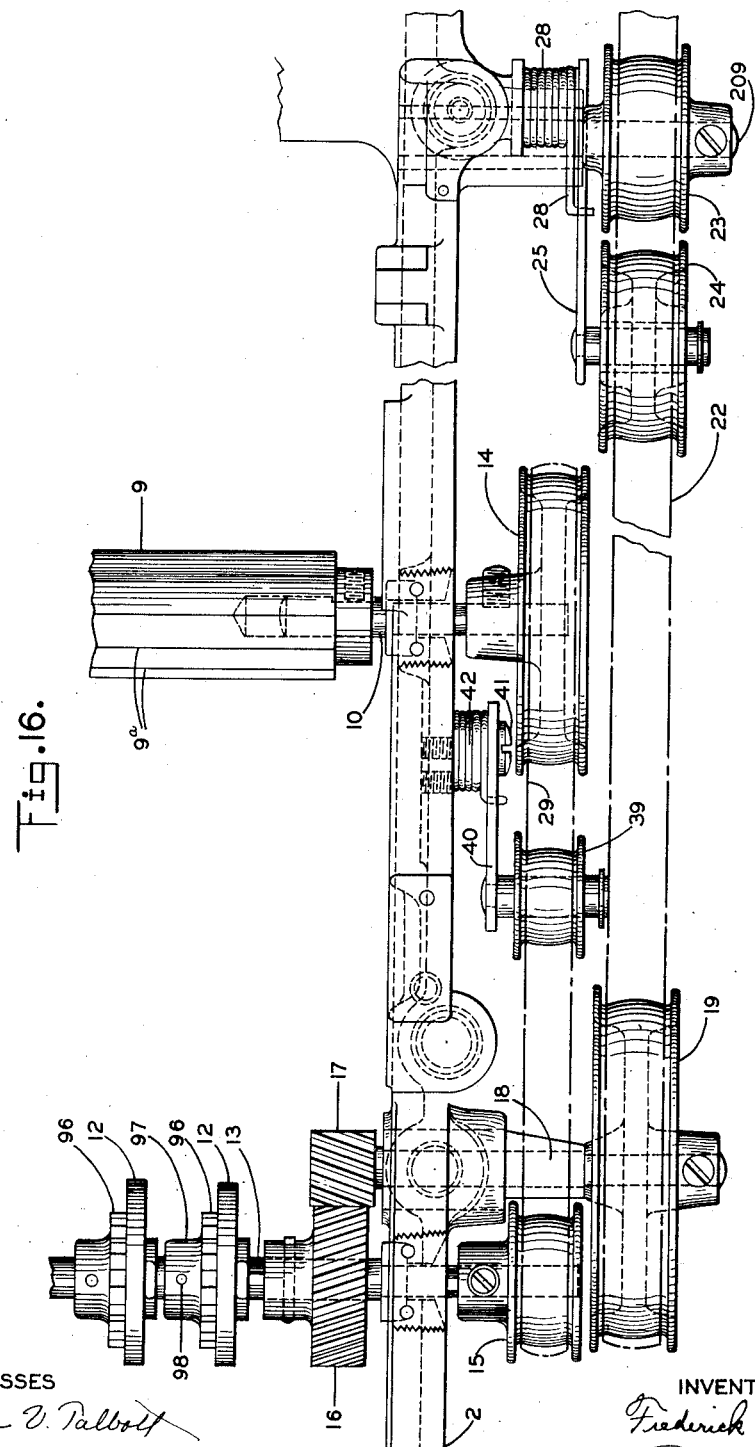

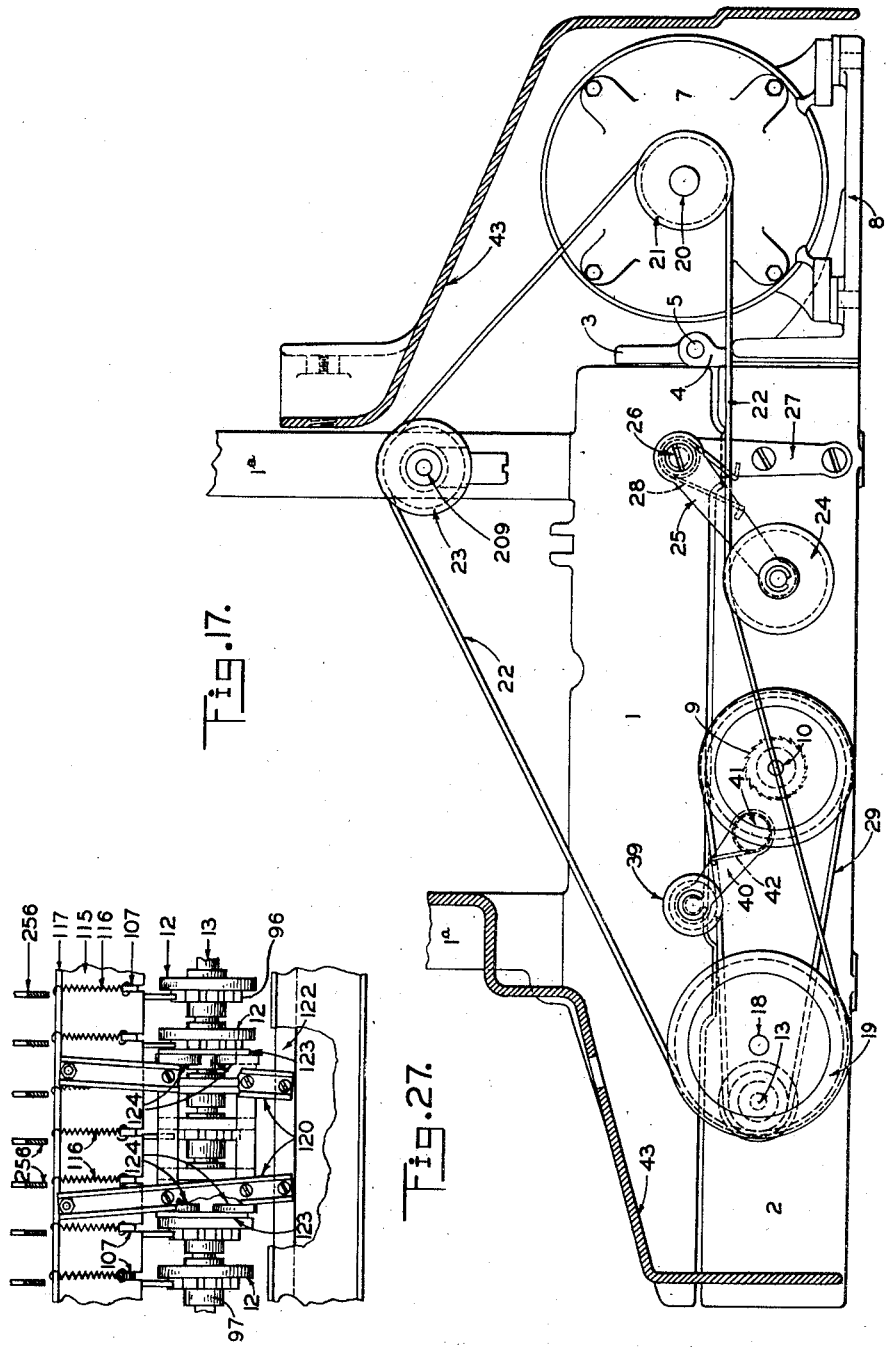

Dec. 8, 1936.　　　　　F. A. HART　　　　　2,063,737
COMBINED TYPEWRITING AND COMPUTING MACHINE
Filed Jan. 24, 1931　　　14 Sheets-Sheet 11
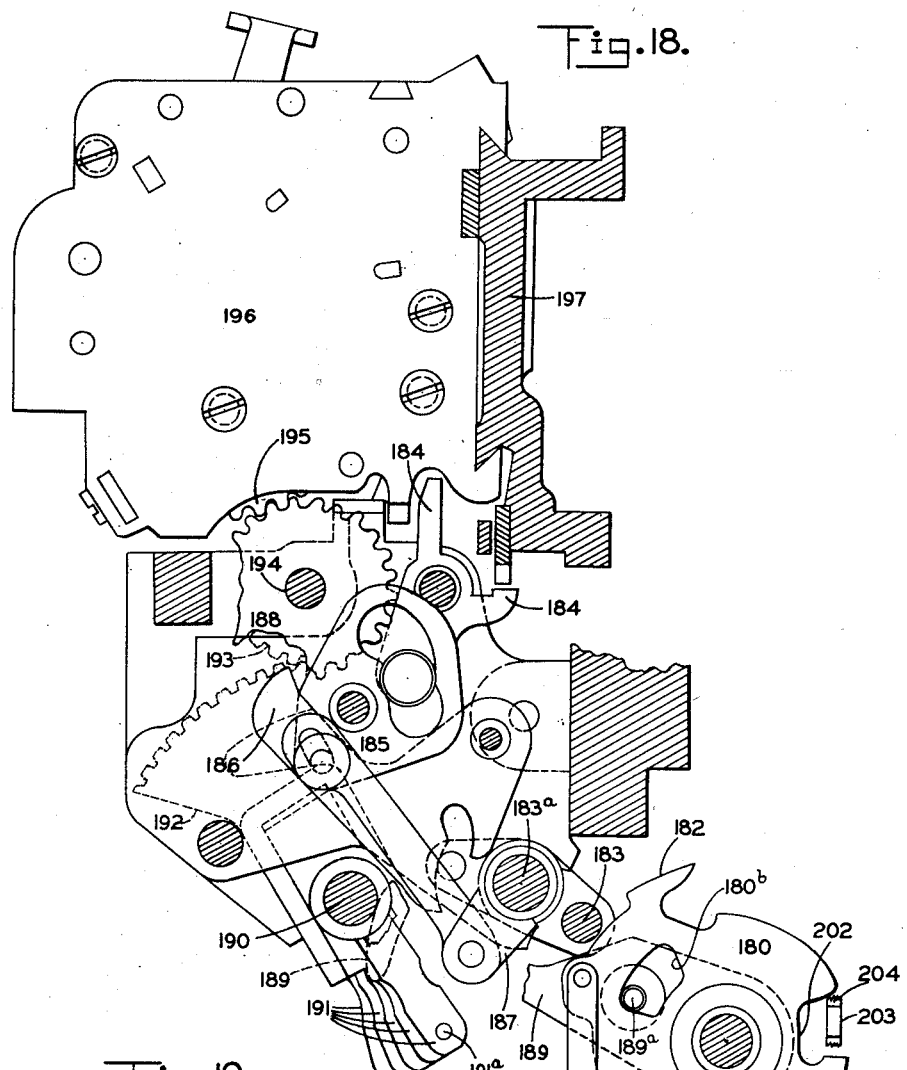
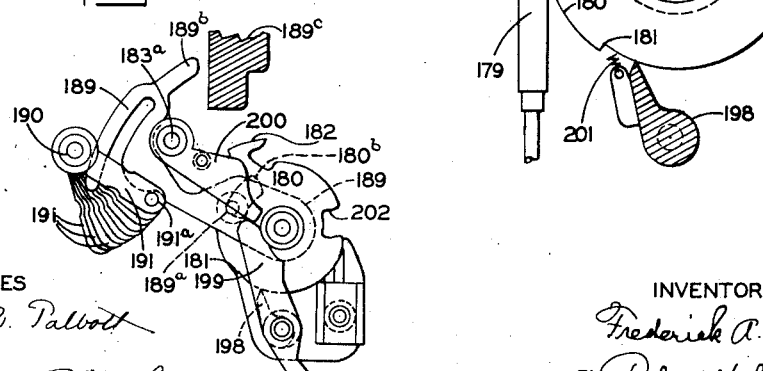
WITNESSES
INVENTOR
Frederick A. Hart
BY Robert H. Strother
ATTORNEY Dec. 8, 1936.　　　　F. A. HART　　　　2,063,737
COMBINED TYPEWRITING AND COMPUTING MACHINE
Filed Jan. 24, 1931　　　14 Sheets-Sheet 12
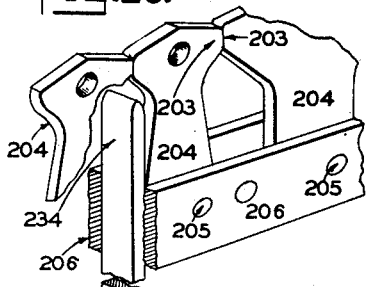
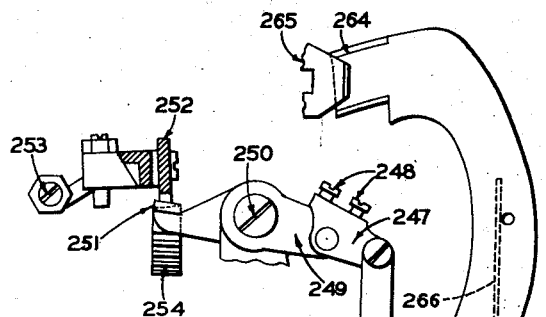
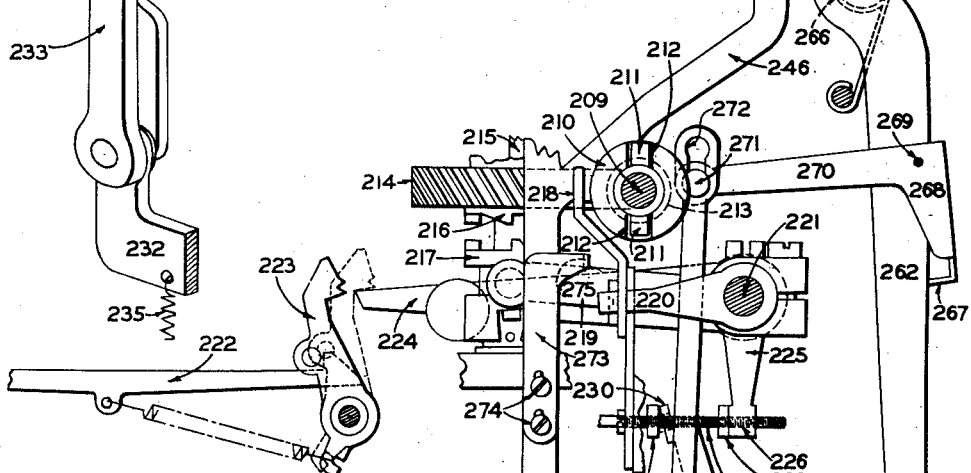
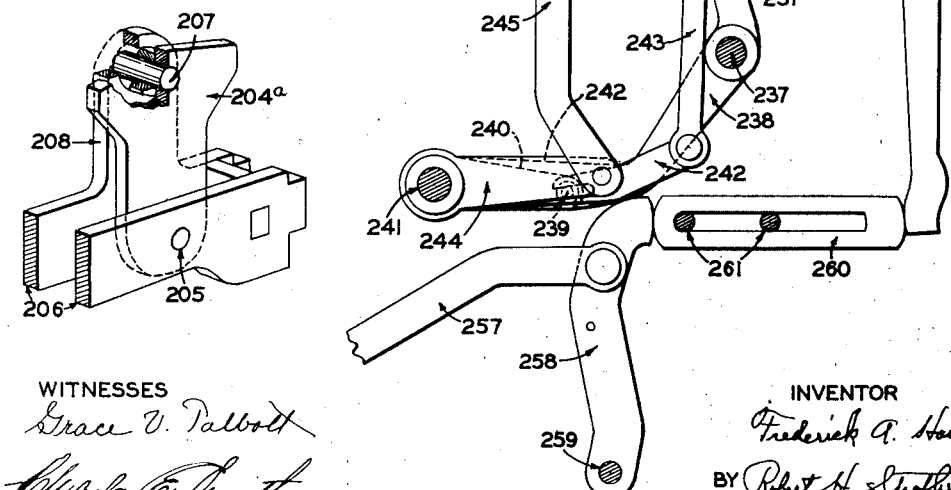

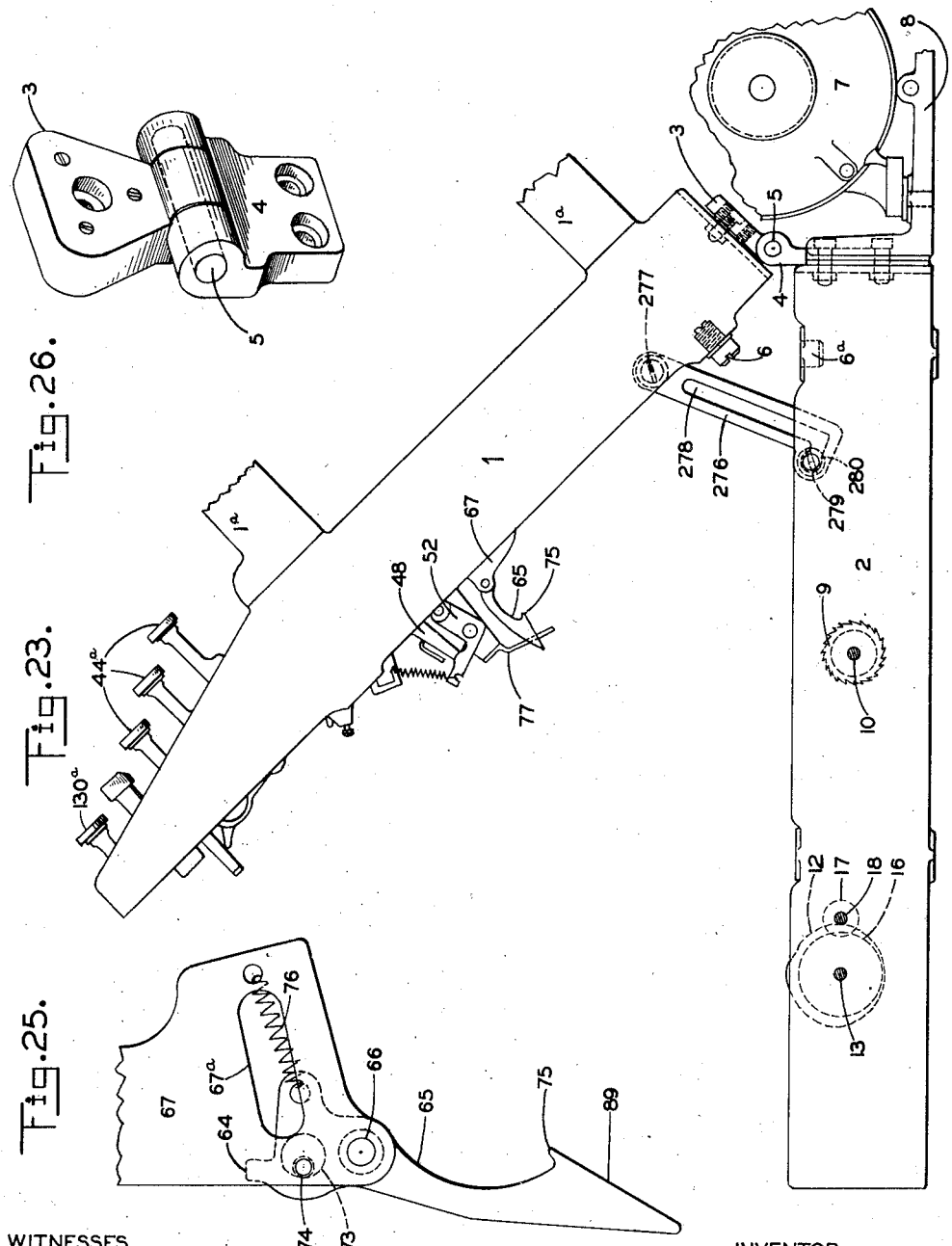

Dec. 8, 1936.   F. A. HART   2,063,737
COMBINED TYPEWRITING AND COMPUTING MACHINE
Filed Jan. 24, 1931   14 Sheets—Sheet 14
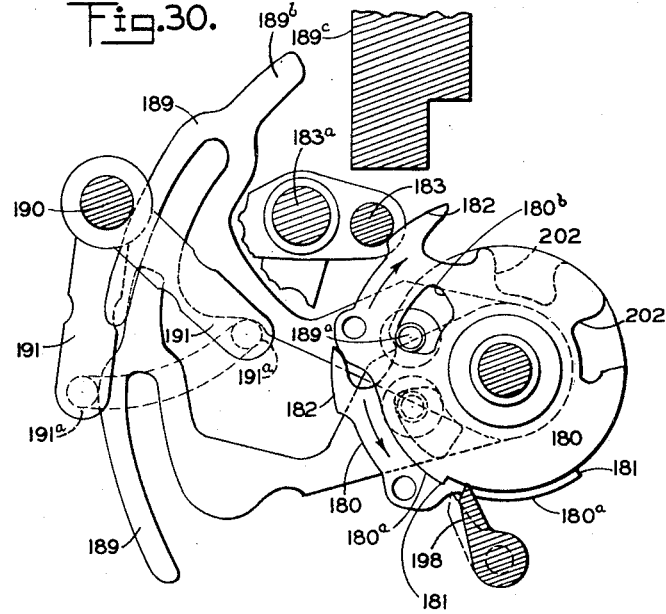
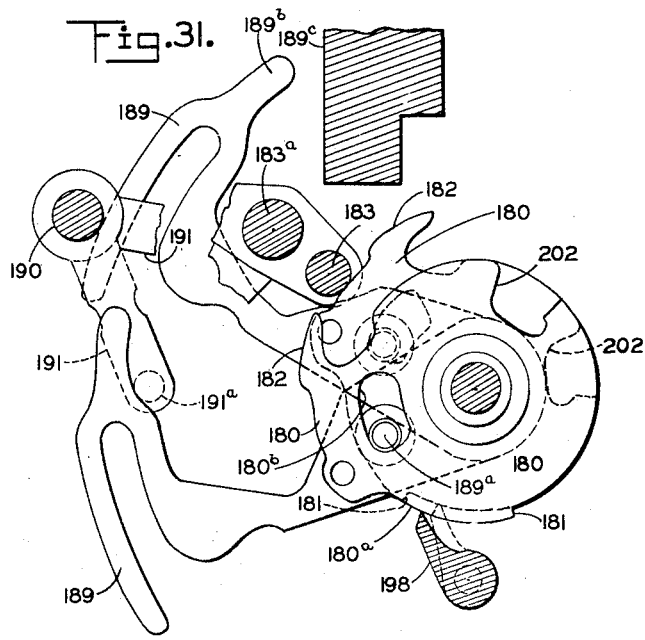
WITNESSES
Grace V. Talbott
Charles R. Smith
INVENTOR
Frederick A. Hart
BY Robert H. Strother
ATTORNEY Patented Dec. 8, 1936

2,063,737

UNITED STATES PATENT OFFICE 2,063,737

COMBINED TYPEWRITING AND COMPUTING MACHINE

Frederick A. Hart, New Britain, Conn., assignor to Remington Typewriter Company, Ilion, N. Y., a corporation of New York Application January 24, 1931, Serial No. 510,941

23 Claims. (Cl. 235—59)

My invention relates to power-actuated combined typewriting and computing machines.

One of the main objects of my invention, generally stated, is to provide highly efficient mechanism of the character specified that is durable, reliable in its operation and comparatively simple in its construction.

A further object of my invention is to provide power-actuated means which may be readily employed in conjunction with existing computing and typewriting mechanisms without materially modifying such mechanisms.

Another object of my invention is to provide improved means whereby the computing mechanism is actuated from a spring force, whereas the numeral printing instrumentalities are actuated from a positively applied motor-driven force.

A still further object of my invention is to provide means to operate the computing mechanism from an actuating member in the movement of the latter from normal position and to actuate the numeral printing mechanism by the return of said actuating member to normal position, thereby insuring a completion of the operation of the computing mechanism before the numeral printing mechanism is actuated and the carriage advanced.

Another object of my invention is to provide means for actuating the numeral printing instrumentalities from one motor-driven actuating member and for actuating the alphabet printing instrumentalities from another separate and distinct motor-driven actuating member.

A further object of my invention is to provide means for preventing a false operation of parts of the mechanism under certain peculiar and unusual conditions of use of the machine, and which false operation if permitted to occur might result either in tying up the machine or in a failure to carry the amount into the register.

Still another object of my invention is to construct the machine having the foregoing characteristics in two separate units, one of which may be readily displaced or detached from the other without interference from coacting parts carried by the two units, and in which the two units may be as readily brought together and the coacting parts thereon properly correlated and the machine conditioned to function.

Another object of my invention is to provide improved automatically operating means for locking the computing mechanism against actuation when the tabulating mechanism is actuated and also when the power-driven carriage-return mechanism is rendered effective to return the carriage.

A further object of my invention is to provide efficient means for insuring maintenance of each of the controlling cams in its normal position and for insuring maintenance of the associated locking pawl out of cooperative relation with its companion driving wheel when the parts are in a position of rest.

To the above and other ends which will hereinafter appear my invention consists in the features of construction, arrangements of parts and combinations of devices set forth in the following description and particularly pointed out in the appended claims.

In the accompanying drawings, wherein like reference characters designate corresponding parts in the different views, Fig. 1 is a fragmentary, vertical, fore and aft sectional view of a portion of a machine embodying my invention.

Fig. 2 is a fragmentary, detail side view of one of the alphabet printing type actions and a portion of the power-driven means by which it is actuated, with the parts shown in the normal position.

Fig. 3 is a like view of the same with the parts shown in the actuated position.

Figure 1:
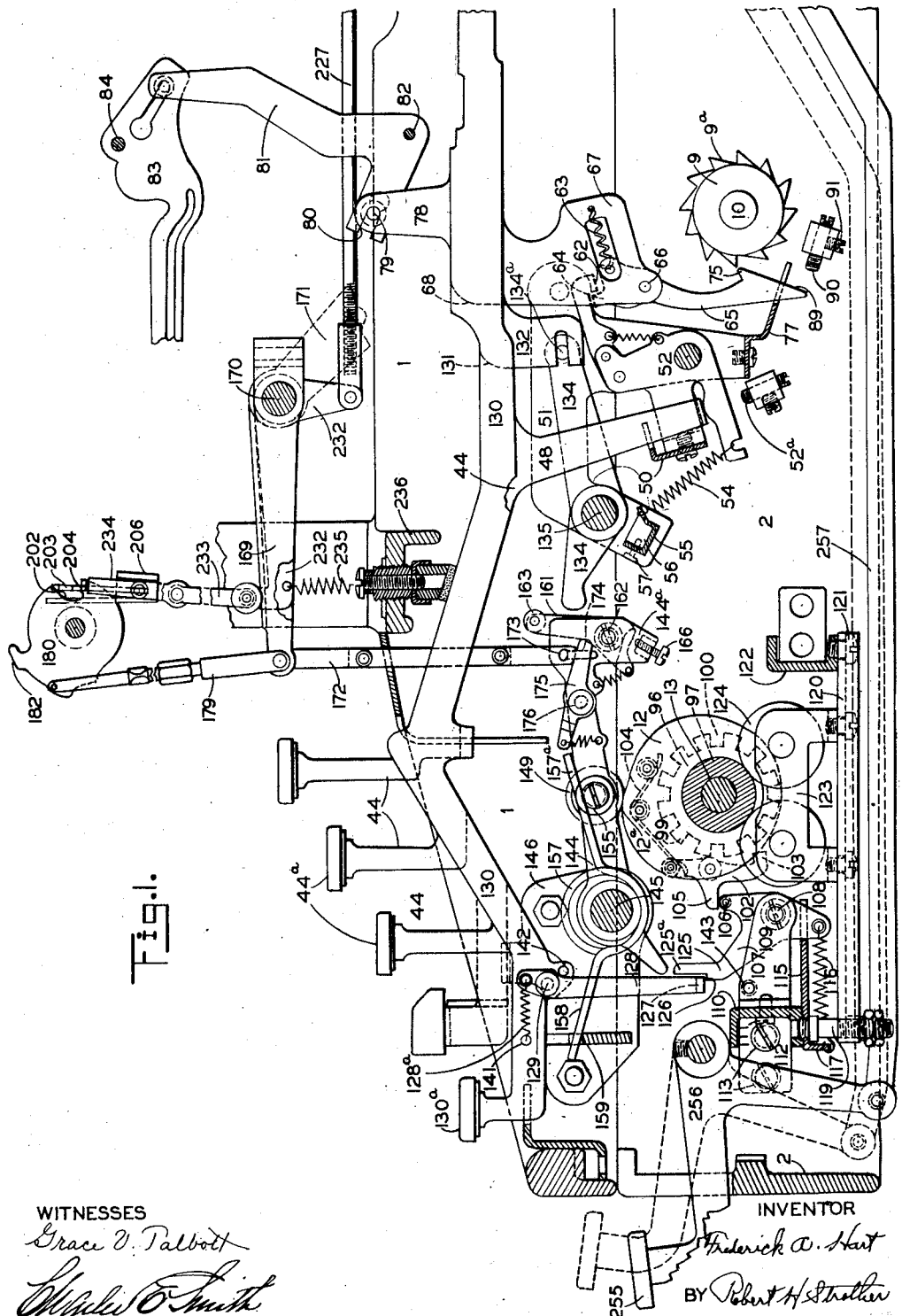

Fig. 3ª is a like view of the same showing the parts as they appear when the actuated type bar and connected parts have returned to normal position, but the actuated key lever is held depressed by the operator.

Fig. 4 is a fragmentary, side view of one of the numeral printing type actions and the power-driven means for actuating it and the computing mechanism, the parts being shown in the normal position.

Figs. 5 and 6 are like views of the same showing the parts as they appear at different stages in the operation.

Fig. 7 is an enlarged, detail, fragmentary side view of one of the trip devices by which a numeral printing type bar is actuated.

Fig. 8 is an enlarged, detail, fragmentary, perspective view, with some of the parts separated, of one of the actuating members and the resilient connection between such member and the computing mechanism.

Fig. 9 is a detail, perspective view of a group of alphabet and numeral key levers and some of the associated parts.

Fig. 10 is an enlarged detail, fragmentary, perspective view of a group of the controlling cams and some of the associated parts.

Fig. 11 is an enlarged, detail, top plan view of the same.

Fig. 12 is an enlarged, detail, fragmentary, top plan view of one of the actuating arms.

Fig. 13 is an enlarged, detail, fragmentary sectional view showing one of the operating cams and the means for mounting it and the associated driving wheel on the supporting or driving shaft.

Fig. 14 is an enlarged, detail, fragmentary, central, vertical, fore and aft sectional view showing a portion of one of the type actions and some of the associated parts.

Fig. 15 is a like view showing the fulcrumed end portions of the type action controlling levers and some of the associated parts.

Fig. 16 is an enlarged, detail, fragmentary, top plan view of the controlling cams, the snatch roll and the driving connections therefor.

Fig. 17 is a fragmentary, side view of the machine, partly in section and showing the driving connections illustrated in Fig. 16 and the connection to the motor.

Fig. 18 is an enlarged, detail, side view, with parts in section, of the computing mechanism with parts omitted.

Fig. 19 is a like view of a portion of the same, shown on a smaller scale.

Figs. 20 and 21 are fragmentary, detail, perspective views of portions of the lock for the actuator of the computing mechanism.

Fig. 22 is a fragmentary, detail, side elevation showing a portion of the tabulator and power-actuated carriage-return mechanisms and the means for controlling the lock for the actuator of the computing mechanism therefrom.

Fig. 23 is a fragmentary side view of the machine, with parts omitted, showing the upper frame section swung back on the base frame.

Fig. 24 is an enlarged, detail, side view of one of the pawl carrying controlling levers and its pawl employed in the alphabet printing type actions.

Fig. 25 is a like view showing one of the actuating pawls for an alphabet type action and a portion of the actuating lever it controls.

Fig. 26 is a detail, perspective view of one of the hinges by which the two frame sections are connected.

Fig. 27 is a bottom plan view of the centrally disposed supporting means for the cam carrying shaft and some of the associated parts.

Figs. 28 and 29 are enlarged, detail side view of parts of the actuating means for the computing mechanism, showing the parts as they appear at different periods in the actuation thereof.

Figs. 30 and 31 are enlarged, detail, diagrammatic side views illustrating the manner in which false operations of parts of the computing mechanism might take place under certain conditions of use, in the absence of safety devices of the present invention which prevent it.

In the present instance the features of my invention have been embodied in a No. 23 Remington accounting machine which is equipped with computing mechanism similar to that disclosed in the patent to Wahl No. 1,270,471 dated June 25, 1918. While the devices of my present invention may be incorporated in such a machine without materially modifying many of the existing structural features thereof, and it is one of the objects of my invention to attain this end, it should be understood that I am not restricted in the use of the invention to any particular character of combined typewriting and computing machine, but that it may be employed wherever found available.

In the present instance I have shown the machine equipped with carriage-return mechanism actuated by a constantly running motor as disclosed in my companion application filed May 20, 1931 bearing Serial No. 538,725.

In the accompanying drawings I have shown only so much of the No. 23 Remington accounting machine and the carriage-return mechanism of my said application Serial No. 538,725, as is necessary to arrive at an understanding of the features of my present invention in their combination therewith.

In the present embodiment of the invention I prefer to include the mechanism in two units, in one of which the parts are carried by a frame 1 (see Fig. 23) that is the same as the frame of the No. 23 Remington accounting machine with its corner posts 1ª, top plate, etc., whereas the parts of the other unit are carried by a second frame 2 that constitutes a base on which the frame 1 rests and to which it is pivotally and detachably united. The coacting working parts carried by the two frames 1 and 2 are so related that the upper frame 1 may be swung on the base 2 to, and maintained in, the position shown in Fig. 23 in order to give access to the parts contained within the frame 1 at the lower portion thereof, and also to give access to underlying parts contained within the base frame 2. When the frame 1 is again lowered on the base frame 2, the said coacting parts on the two frames will be brought into cooperative relation ready to function, as will hereinafter more clearly appear.

Any suitable means may be employed to detachably connect and hinge the two frames 1 and 2 together. In the present instance I employ two hinges each comprising the sections 3 and 4 united by a spindle or pivot 5, as shown in Fig. 26. Each section 3 is secured to the base of the frame 1 at the rear thereof, whereas each section 4 is secured to the lower frame 2, and the two sections are pivotally united by a spindle or pivot 5 that is received with a drive fit in the section 4 and has a loose fit in the companion section 3. By driving the spindles 5 out of their drive fit bearings the two frames 1 and 2 may be detached one from the other, if desired.

I prefer to employ a dowel pin 6 in each side of the base of the frame 1, said dowel pins being received in corresponding openings 6ª in each side of the lower frame 2 when the frame 1 is lowered into position and supported on the frame 2.

In the machine, as shown, various driving devices are employed which are driven from a constantly running electric motor 7, as best shown in Figs. 1, 16, 17 and 23. The motor 7 is detachably secured to a bracket 8 which in turn is detachably secured to the frame 2 at the rear thereof. The driving devices in question include a tooth-bearing snatch roll 9 fixedly mounted to turn with a motor-driven shaft 10, and a series of independently operable controlling cams 12 loosely mounted on but adapted to be selectively coupled with a motor-driven shaft 13, as will hereinafter more clearly appear.

The shafts 10 and 13 are preferably mounted on ball bearings, as shown in Fig. 16, and at the right-hand side of the machine said shafts extend beyond the frame 2 where they are provided with driving pulleys 14 and 15 respectively. A worm gear 16 is fixed on the shaft 13 and meshes with a worm pinion 17 fixed on a short driving shaft 18 mounted to turn in a bearing in the base frame 2. The outer end of this shaft carries a driving pulley 19 from which motion is transmitted to the shaft 13. The motor shaft 20 carries a driving pulley 21 over which a driving belt 22 passes to the pulley 19 and thence to a driving pulley 23 carried by a rear corner post 1ª of the frame 1 to operate the carriage-return mechanism, as will hereinafter appear. The belt 22 in passing from the pulley 21 to the pulley 19, coacts with a take-up pulley 24 mounted on an arm 25 pivoted at 26 to a bracket arm 27 fixed to the frame 2. This arm is pressed upward by a spring 28 to take up any slack in the driving belt 22.

The pulleys 14 and 15 are connected by a driving belt 29 that receives downward pressure from a take-up pulley 39 mounted on an arm 40 pivoted at 41 on a side of the frame 2 and pressed downward by a spring 42 to take up slack in said belt 29.

Motion is thus transmitted from the motor shaft to the cam-carrying shaft 13 and from the latter to the snatch roll 9 so that they operate in unison but at the proper ratio, the shaft 13 turning at, say, two and one half times the speed of the snatch roll shaft 10 in the present instance.

In order to provide a protection against the operator coming into contact with the motor and driving mechanism described above, which is outside the frames 1 and 2, I prefer to employ a housing 43 which entirely encloses said parts and is shown in section in Fig. 17. This housing is detachably connected to the frames 1 and 2, and when employed must first be removed before the frame 1 and the parts carried thereby can be swung back on or detached from the lower or base frame 2. It also is necessary or advisable to first remove the belt 22 from the pulley 23.

Of course it will be understood that so far as some of the more important features of my invention to be hereinafter described are concerned, the separable or detachable units and the housing hereinbefore described may or may not be employed.

The snatch roll 9 is provided with teeth 9ª which extend throughout the length thereof and from side-to-side of the base frame 2. This snatch roll is provided to operate on connections by which the alphabet printing instrumentalities alone are actuated, the numeral type bars and computing mechanism being controlled from the cams 12 as will presently appear; such cams having no control of the alphabet printing type bars. I will first describe the manner of operating the alphabet printing type bars from the snatch roll.

Referring more particularly to Figs. 1, 2, 3, 9 and 15 of the drawings, it will be seen that substantially horizontally disposed alphabet key levers 44 extend in fore and aft, vertical, parallel planes and are all fulcrumed at their rear ends on a common fulcrum bar 45 carried by the frame 1. A contractile returning spring 46 is connected to each of said key levers and is provided with the usual adjusting screw 47 to vary the tension thereof. Each key lever 44 carries a depending arm 48 that terminates in a laterally extending lug 49. Said arms are guided by a guide comb 50 carried by brackets 51 secured to each side of the frame 1 but maintained spaced apart therefrom. Each lug 49 coacts with an angular trip-carrying lever 52, shown in detail in Fig. 24. These levers 52 are mounted to turn on a fixed pivot rod 53 supported at its ends by the brackets 51. Each lever is connected to one end of a contractile returning spring 54 connected at its opposite end to a fixed sheet metal channel bar 55. This bar is received at its ends in correspondingly shaped openings 56 in depending arms of the brackets 51 and is held against longitudinal displacement by screws 57 threaded into tapped openings in the bar and bearing against the outer sides of the bracket arms.

Pivoted at 58 to each lever 52 is a trip pawl 59 provided with an opening 60 therein through which a stop pin 61 on the associated lever 52 extends, as shown in Fig. 24, thus providing stop surfaces to limit the movement of each pawl relatively to its carrying lever. Each pawl 59 is provided with a hook-like end 62 and is connected by a spring 63 with the companion carrying lever 52. The hook-like end 62 of each trip pawl coacts with an upwardly extending projection 64 on a companion engaging or actuating pawl 65, shown in detail in Fig. 25. Each pawl 65 is pivoted at 66 on the depending forward end portion 67 of a substantially horizontally disposed type bar actuating lever 68 parallel with and interspersed between the key levers 44. There is one lever 68 for each alphabet key lever and they are all fulcrumed on the common fulcrum bar 45 in the rear of the machine, each lever 68 being connected to a returning spring 69 having an adjusting screw 70, as indicated in Fig. 15. Each of the levers 68 is provided with a depending projection 71. Upon reference to Fig. 15 it will be understood that each projection 71 coacts with a universal bar 72 mounted and functioning in the usual manner to interpose the ribbon in the path of a type bar as the latter approaches the printing position. Such ribbon control mechanism may be the same as that usually employed in different standard Remington machines.

As shown in Fig. 25, each engaging pawl 65 is provided with stop devices similar to those employed on the parts 52, 59. Thus, each pawl 65 has an enlarged opening 73 therein for the reception of a stop pin 74 carried by the companion part 67 of the lever 68 to which said pawl is pivoted. These stops limit the movement of the hook-like lower ends 75 of the pawls away from the teeth of the snatch roll 9 under the force of the contractile springs 76. Each of said springs 76 is connected at one end to a pawl 65 and passes through an opening 67ª to the opposite side of the companion part 67 where the other end of the spring is secured.

The lower end portion of each engaging pawl 65 is guided in a guide slot of a guide comb 77 secured at its ends to depending arms of the brackets 51.

Referring to Fig. 1, it will be seen that each of the levers 68 carries an upwardly extending projection 78 that carries a pin 79. Said pin operates in the usual manner in a slot 80 of a sub-lever 81, pivoted at 82 and operatively connected at its upper end with an alphabet printing type bar 83. All of the type bars are pivoted as indicated at 84 (see Fig. 14) to a type bar segment 85 in order to swing upwardly and rearwardly to the printing point and make an imprint against the platen 86, or the paper thereon, through the usual ribbon, not shown. As each type bar approaches the printing position a contact 87 thereon coacts with a universal bar 88 (see Fig. 28) to move the latter and control the escapement mechanism to effect a letter-space movement of the carriage (not shown) and the platen 86 carried thereby.

So much of the type actions as includes the sub-levers 81, the type bars and the manner of mounting the same, the carriage construction, the carriage feed mechanism, the ribbon control mechanism, etc., are, or may be, of the usual construction employed in standard Remington machines.

The effect of depressing an alphabet key 44ª from the normal Fig. 2 position, is to turn the associated lever 52 in an anti-clockwise direction on its pivot 53 until said lever is arrested by an adjustable screw stop 52ª normally held in a fixed position by a locking screw 52ᵇ. This results in throwing the engaging portion 75 of the companion pawl 65 into the path of the teeth 9ª of the constantly running snatch roll 9. When the pawl 65 is thus engaged by the snatch roll it will be carried down as indicated in Fig. 3, thereby actuating the companion lever 68, sub-lever 81 and type bar 83. The parts will continue this movement until the type bar is positively moved to a distance of about one and one-quarter inch from the platen when the pawl 65 is disengaged from the snatch roll and the type bar continues its movement to the printing position by its own momentum and that of the parts connected therewith. When the pawl 65 is engaged by the snatch roll, it will continue its downward movement until the cam edge 89 on the pawl is driven against an adjustable fixed abutment in the nature of a screw 90 held in its adjusted position by a holding screw 91. As the pawl continues to descend it will be cammed out of engagement with the snatch roll 9. Fig. 3 shows the parts just prior to the time such disengagement is effected and Fig. 3ª shows the position of the parts after the actuated type bar and its actuating lever 68 and pawl 65 have been returned to normal position by the companion spring 69 and while the associated key lever 44 is still maintained depressed by the operator. From this last mentioned view it will be seen that the bottom of the nose or engaging end 62 of the actuated trip pawl 59 is on top of and will ride back on the top of the companion projection 64 and drop to the rear thereof when the operator releases the actuated key lever 44, thus reestablishing operative connection between said key lever and the companion actuating pawl 65. It follows, therefore, that no repeat operation of a type bar can take place until after the depressed finger key is released and has been returned substantially to its normal position. It also will be observed that the engaging portion 62 of each releasing pawl 59 can never move to a position where it is in front of the companion projection 64.

It follows from the foregoing construction and arrangement of parts, not only that no repeat operation of the type action can take place due to holding the key down, but that there is no shock transmitted to the operator's finger in the actuation of the type bar from the snatch roll. This last mentioned effect is due to the fact that the key lever 44 merely moves the actuating pawl 65 into the path of the teeth on the snatch roll, and that the movement of said pawl by the snatch roll is downwardly away from the companion pawl 59 so that no shock is transmitted to the latter or to the operator's finger which is holding said pawl in the actuated position.

I will now describe the operation of the computing mechanism and the numeral printing type bars, it being understood from what has been said above that the alphabet printing type bars are actuated without having any effect on the computing mechanism.

It has been explained that the actuation of the computing mechanism and numeral printing type bars is under control of the power-driven cams 12. As shown in Fig. 13 each of these cams is mounted on bearing balls 92 received in a V-shaped bearing groove in the cam and between relatively adjustable cone bearings 93 and 94, a lock nut 95 holding the cone bearings in their positions of relative adjustment. Each cone bearing 93 is formed as an integral part of a locking or driving wheel 96 the hub 97 of which is fixed to the driving shaft 13 by a pin 98. The ends of the teeth 99 of each locking wheel 96 are preferably flat, and they are separated by interdental spaces 100 having substantially parallel side walls as shown in dotted lines in Fig. 4 and in Fig. 10. Pivoted at 101 on one side of each of the cams 12 is a locking pawl 102 that has a squared engaging nose 103 that fits in any of the spaces 100 of the companion locking wheel and effectively locks the associated cam to said wheel to turn therewith and with the shaft 13 that carries it. A spring 104 is connected to each locking pawl 102 and exerts its force to move the engaging nose of the pawl towards the associated locking wheel 96 and into one of the spaces 100 thereof. Should the engaging nose of the pawl happen to rest on the end of a tooth 99 of the wheel, as shown in Fig. 4, when the pawl is thrown towards the wheel by its spring, then as the first space 100 of the rotating wheel reaches said nose the latter will be forced into the space, locking the cam to turn with the driving shaft 13.

Means are provided whereby at each depression of a numeral printing key the corresponding cam 12 will be locked to turn with shaft 13 as above described, but for a single revolution only of the cam and the latter will then be automatically released. Such means will now be described.

Referring more particularly to Figs. 1, 4, 5, 6, 10 and 27 it will be seen that each pawl 102 has a projection 105 that in the normal position of the parts, shown in Fig. 1, coacts with an antifriction roller 106 on a trip lever 107 to hold the associated pawl 102 against the force of its spring 104 and disengaged from the companion locking wheel 96. Each lever 107 is pivoted at 108 on a hanger arm 109 secured to a cross bar 110 by screws 111. The bar 110 is provided at its ends with feet 112 by which it is secured by screws 113 to the base frame 2. The lower end portion of each lever 107 is guided in a slot in a guide comb 115 and is limited in its clockwise movement by coacting with the end wall of its guide slot, as shown in Fig. 1. A contractile spring 116 is connected at one end to each lever 107, the opposite end of each spring being anchored to a flange 117 provided at the forward edge of the guide comb 115. The guide comb 115 is secured by screws 118 (Fig. 5) to the cross bar 110 and in turn supports depending posts 119 (Fig. 1) by which a supporting frame, designated as a whole by the reference numeral 120, is supported. The rear end of the supporting frame 120 is secured by screws 121 to a second cross bar 122 corresponding to cross bar 110 and secured at its ends in a like manner to the side members of the frame 2. The supporting frame 120 and associated parts are best shown in Figs. 1 and 27, from which it will be seen that upstanding side members 123 on the supporting frame provide supports for two pairs of bearing rollers 124 located intermediate the ends of the shaft 13 and beneath the same, one roller 124 of each pair being located forward of the axis of the shaft and the other in the rear thereof. These rollers coact with the hubs 97 of two of the locking wheels 96 to provide an antifriction support for the shaft intermediate its ends, to resist downward thrust on said shaft from the pressure of spring-pressed actuating members that coact with the cams 12, as will hereinafter appear.

Reverting again for a moment to the trip levers 107 it will be seen that an upwardly and forwardly extending arm 125 on each of them has a shoulder or engaging portion 126 adapted to be engaged by a laterally projecting lug 127 on a depending arm 128. This is in order to shift the companion trip lever 107 to the ineffective position, shown in Fig. 4, and free the associated pawl 102. This enables the pawl 102 to lock its cam 12 to the companion locking wheel 96 during a period of one revolution only of said wheel, as will hereinafter appear. The upwardly extending end portion 125a on each arm 125 prevents the associated lug 127 from moving rearward of the companion arm 125 and aids in bringing the members 127 and 126 in proper correlation when the frame 1 is moved down on the frame 2 from the Fig. 23 position.

Each of the arms 128 is pivoted at 129 to its associated key lever 130. The key levers 130 are provided with keys 130a and are those which control the printing of the numerals and the actuation of the computing mechanism. Such levers 130 correspond to the key levers 44 except that the former are devoid of the arms 48 and are provided with the pivoted arms 128. The key levers 130 are interspersed among the levers 44 and 68 in like parallel arrangement, and are fulcrumed on the common fulcrum bar 45 and are provided with returning springs like the springs 46. Associated with each key lever 130 and arranged adjacent thereto and parallel therewith is a lever 131 fulcrumed on the bar 45 and provided with a depending portion 132 slotted at 133 to receive a pin 134a projecting laterally from a companion lever 134. Such levers 134 are pivoted intermediate their ends in parallel arrangement on a pivot rod 135 and are spaced apart thereon by suitable spacing sleeves 136. The levers 134 are power-actuated under control of the cams 12 in a manner which will be presently explained, and each companion lever 131 is connected to a numeral printing type bar in the same manner as the alphabet printing type bars are connected to their actuating levers 68. Thus, by referring to Fig. 4, for example, it will be seen that each lever 131 has an upwardly extending projection 137 provided with a laterally extending pin 138 that engages in a slot 139 in an angular sublever 140 connected to the companion type bar in the manner hereinbefore described.

Referring once more to the trip levers 107 and the manner of controlling them and the control of the pawls 102 thereby, it will be seen that the upper end of each of the arms 128 is connected to one end of a contactile spring 128a connected at its opposite end to a pin 141 on the associated key lever 130. The force of each of these springs 128a is exerted to normally hold the companion arm 128 against a stop pin 142 carried by the associated key lever, as shown in Fig. 1.

As a key lever 130 is depressed to the Fig. 4 position it results in turning the companion lever 107 in an anti-clockwise direction until the latter is arrested by a stop pin 143 on the associated hanger arm 109, and the pawl 102 which was held by said lever 107 has been released. At about this time the parts assume such a position that the lug 127 on the arm 128 will slip off and disengage the shoulder 126 on the actuated lever 107, thereby releasing the latter from control of the depressed key lever 130 and permitting an independent return of the lever 107 to normal position under the force of its spring 116. As soon as the pawl 102 has been released in the manner described, the projection 105 thereon will drop to a position where the roller 106 cannot return to the front of said projection even in the event that the nose 103 of the locking pawl drops on top of a tooth 99 of the companion locking wheel, as shown in Fig. 4, instead of in an interdental space 100 therein. When the locking pawl 102 effects a locking engagement with its rotating locking wheel 96, the companion cam 12 will be locked to rotate with said locking wheel and the driving shaft 13 on which it is mounted. This results in carrying the pawl 102 around with the locked cam and carrying it in an anti-clockwise direction away from the actuated lever 107 which is immediately returned to normal position, as shown in Fig. 5, prepared to coact with the projection 105 and release the locked pawl from its locking wheel 96 when the latter completes one revolution. The parts will then again be in the Fig. 1 position assuming the depressed key lever 130 has been released by the operator. However, should the operator hold the key 130a depressed, as indicated in full lines in Fig. 6, the actuated lever 107 will, nevertheless, have returned independently thereof to normal position to coact with the projection 105 of the companion pawl and release it; the parts at such time, other than the depressed key and the parts carried thereby, being in the Fig. 1 position.

It follows from what has been pointed out above that each depression of a numeral printing key 130a will result in a single revolution only of the associated cam 12 from the power driven shaft 13, even though the actuated key be held depressed by the operator. From what follows it will be understood that it is necessary for the operator to permit the return of the depressed key substantially to its normal position before the same key can again be actuated to effect another revolution of its associated cam, although from a consideration of the full and dotted line showing of one of these keys in Fig. 4, for example, it will be seen that the extent of such return movement is not very great.

Having described the manner in which the cams 12 are selectively driven from the power shaft 13, I will next describe how motion is positively transmitted from said cams to the numeral printing type bars.

From an inspection of Figs. 1, 4, 5, 6, 7, 10, 11 and 12 it will be seen that there is provided a series of oscillatory actuating members 144, corresponding to the number of cams 12 employed, of which there are, in the present instance, eleven; one for each of the numeral printing type bars 0 to 9 inclusive and one for the usual pence key when the machine is equipped in the usual manner for writing and computing English money. Each of the actuating members 144 is in the nature of a lever or arm pivoted to turn loosely on a fixed pivot rod 145 mounted at its ends in brackets 146 secured to the frame 1. The members 144 are maintained spaced apart on the pivot rod by spacing sleeves 147 (see Fig. 10) each fixedly attached to the pivot rod by a set screw 148. Each member 144 carries a roller 149 pivotally supported on one side thereof, as indicated in detail in Fig. 8. From this view it will be seen that a headed pivot pin 150 passes through a central opening 151 in the roller 149, the reduced portion 152 of the pin providing a bearing for the roller and also being seated in an opening 153 in the arm 144. The still further reduced portion 154 of the pivot pin provides a bearing for a second, peripherally grooved roller 155 on the opposite side of the arm 144. A headed screw 156 is received in a tapped opening in the right-hand end of the pivot pin 150 and holds the parts assembled. Each of the members 144 is equipped with such rollers 149 and 155, the former as previously pointed out bearing against its associated cam 12, whereas each roller 155 provides a bearing for one end portion 157ª of a heavy spring 157. The opposite end portion 158 of each of said springs bears against a cross bar 159 secured at its ends to the frame 1. The portion of each spring 157 intermediate its ends is coiled around the companion spacing sleeve 147 on the pivot rod 145, as clearly indicated in Fig. 10. The force of each of these springs is exerted downward on the companion member 144, the movement of such member under the force applied by its spring being resisted by the associated cam 12. The power of each spring 157 is sufficient to actuate the computing mechanism as will presently appear, but this spring is not required to actuate the companion numeral printing type bar, the latter being positively actuated by the companion cam 12 in returning the associated arm 144 to normal position against the force of its spring 157, as will presently more clearly appear.

Each member 144 extends forward of the pivot rod 145 on which it is mounted to provide a holding or tripping arm 160 that is adapted to cooperate with the companion depending arm 128. The purpose of this cooperation between each holding arm 160 and its companion arm 128 is to hold the latter against return movement into cooperative relation with its trip lever 107 until the companion cam 12 has about completed its cycle. Thus, as the released cam 12 starts to turn from its Fig. 4 position it will permit its arm 144 to be lowered under the force of the companion spring 157 exerted thereon. As the low portion of the cam is approached the arm 160 will move into cooperation with and prevent a rearward movement of the companion arm 128, as will be understood from a consideration of Figs. 5 and 6, and will remain in some such obstructing position substantially until the cam 12 has completed its revolution and the arm 144 has been returned to normal position shown in Fig. 1. This insures a kicking and holding off of the arm 128 from its trip lever 125 to enable the latter to be immediately returned to a position where it will coact with and release the locking pawl 102 as the latter is carried around with the companion cam, and thus prevents reengagement of the arm 128 with its trip lever until the cycle of operations that result from a single revolution of a cam 12 has been completed.

It has been pointed out that each of the cams 12 is mounted on ball bearings. So, therefore, when the cams in the normal position of the parts, shown in Fig. 1, are disconnected from their locking wheels 96, said cams are free and may easily turn on their bearings in a clockwise direction. At this time the reactive force of each spring 104 on its associated cam would be effective to turn it in a clockwise direction, as the parts appear in Fig. 1, in the absence of some means to counteract such movement of the cam. This will best be understood when it is remembered that at this time the companion locking pawl 102 is held by its lever 107 in the released position and against the reactive force of the associated stressed spring 104 so that at this time such force is exerted to turn its companion cam 12 in a clockwise direction. Such a clockwise movement of a cam 12 at this time would result in a movement of the engaging nose 103 of the companion locking pawl 102 towards the teeth of the associated rapidly turning driving wheel 96. Even if the extent of this movement of the locking pawl should be insufficient to enable it to effectively engage the companion driving wheel, or to enable its engaging nose to pass into an interdental space therein, such movement of the pawl would result, nevertheless, in setting up a loud clatter in the machine due to the engaging nose of the locking pawl successively contacting with the ends of the teeth of the rapidly rotating driving wheel. In order to overcome this difficulty I have provided on each cam 12 a high spot or slight elevation 12ª which in the normal position of the parts, shown in Fig. 1, is positioned just forward of the companion roller 149. The greater force of the spring 157 exerted against the roller 149 is effective with the aid of the high spot 12ª on the cam to overcome the tendency of the weaker spring 104 to turn the companion cam in a clockwise direction from its normal position. Therefore, in the normal position of the parts each cam 12 will be accurately held in its normal position notwithstanding the tendency of its spring 104 to move it from such position and will prevent the associated locking pawl 102 from contacting with its rapidly rotating driving wheel. I regard this feature of considerable importance in the production of a successfully operating machine of the character disclosed herein.

It has been explained above that the actuation of a numeral printing type bar does not take place until after the completion of the computing operation and during the return movement of the associated arm 144 under control of its cam 12. While out of order in the successive operations of the parts, I prefer at this point to describe the remainder of the means for effecting such numeral printing because of its simplicity and the little that need be added to what has been hereinbefore described.

As best shown in Figs. 1, 4 to 8, and 12 it will be seen that each member 144 at its free rear end has an enlarged portion 144ª to which a one-way trip lever 161 is pivoted at 162. This trip lever carries an antifriction roller 163 at the upper end thereof for cooperation with its companion actuating lever 134 by which the corresponding type action is controlled, as hereinbefore described. A block 164 (Fig. 7) on the left-hand side of each arm 144 is riveted thereto at 165 and is tapped to receive an adjustable screw stop 166, the upper end of which coacts with an edge 167 of the companion trip lever 161 to limit its motion around its pivot 162 in one direction. A contractile spring 168 is connected at one end to each lever 161 and at its opposite end to the arm 144 which carries it. Said spring normally maintains its trip lever at the limit of its pivotal movement in one direction as indicated, for example, in Fig. 1. As the arm 144 descends to the Fig. 5 position, the roller 163 will bear against the rounded end of the companion actuating lever 134 and the trip lever 161 will be moved against the force of its spring 168 until the roller 163 passes the end of the associated lever 134 without actuating it. When the depressed arm 144 reaches the lowermost, Fig. 5 position, the trip lever 161 will be moved by its spring 168 to the Fig. 5 position where the roller 163 impinges against the under side of the forward end of the cooperative actuating lever 134. At this time the trip lever 161 bears against its screw stop 166 and on an elevation of the arm 144 from the Fig. 5 to the Fig. 1 position by the positive operation of the companion cam 12 thereon, the companion actuating lever 134 will be operated to actuate the corresponding type bar, as shown in Fig. 6. The positive actuation of the type bar continues until it has been moved about two thirds of the distance through which it has to travel to the printing position, when the roller 163 is released from contact with the companion lever 134 and the type bar continues its movement to printing position by its own momentum and that of the actuating parts connected therewith. Fig. 6 shows the position of the parts in full lines at about the instant that the connection between the trip lever 161 and its companion actuating lever 134 is about to be broken. The actuated arm 144 and the trip lever 161 will continue their return movement to normal position under the further movement of the companion cam 12 and will be ready to again actuate the type bar when the latter and the parts connected therewith have been returned to normal position, but always on the return movement only of the associated actuating member 144 to normal position.

I will now describe the means whereby the computing mechanism is actuated by the actuating members 144 under the force of the springs 157 exerted thereon and under control of the cams 12.

There is provided a series of computing mechanism actuator arms 169, one for each of the members 144 employed. The arms 169 are loosely mounted on a pivot rod 170 supported by bracket arms 171 (Fig. 1) secured to the frame 1. Each arm 169 is connected by a link 172 with the companion actuating member 144. For reasons which will presently appear I prefer to employ any suitable resilient connection between each pair of members 144 and 169 that will positively transmit a downward movement from the former to the latter, but will provide a cushioning or resilient connection between the two in the transmission of an upward or return movement to each arm 169 from its companion member 144.

For the attainment of this end in the present instance, I have provided the following construction:

Referring more particularly to Fig. 8 it will be seen that each of the links 172 is bifurcated at its lower end, the arms of the bifurcated portion of the link being on opposite sides of the companion actuating member 144. These arms of each link are united by a pin 173 that passes through an upright slot 174 in the associated member 144, such slots being of appropriate length to attain the ends for which they are provided, as will presently appear. The link 172 is spring pressed upward by a lever 175 that bears against the lower end of one of the arms of the link and causes the pin 173 to be normally seated against the upper end wall of the slot 174. Each lever 175 is pivoted at 176 on a side of the associated member 144. A contractile spring 177 is connected at one end to its lever 175 and at its other end to a screw 178 carried by the associated actuating member 144.

This construction is such that each member 144 in its downward motion under the force of its spring 157 will positively actuate its companion arm 169. However, if in the upward return movement of any of the members 144 under the positive action of its cam 12 the companion arm 169 should for any reason have any undue resistance exerted against it or become locked or blocked against return movement before the high portion of its cam has been reached then the companion slot 174 will enable the rear end of the member 144 to be moved upward without transmitting any movement to its companion link 172. At such time the associated lever 175 will be turned on its pivot 176 against the force of its spring 177. When the obstruction to the return movement of the link 172 is removed, the normal relation between said link 172 and its member 144 will be again established by the spring 177. For reasons which will hereinafter appear, this resilient connection between each arm 144 and the companion link 172, may, if desired, be eliminated and a positive connection between such parts be employed instead.

Connection between each of the arms 169 and the computing mechanism is effected by a series of upstanding links 179, one of them connected to each arm 169. These links 179 may be said to correspond to the usual key actuated links employed in the No. 23 Remington accounting machine. The computing mechanism, employed in the present instance, is the same as that employed in said machine, except in a few particulars to be hereinafter specifically mentioned.

Referring more particularly to Figs. 1, 18 and 19 it will be seen that each link 179 is connected at its upper end to a so-called fan 180 connected in the usual manner through a pin and slot connection 189ᵃ, 180ᵇ with its goose neck 189. These fans are of the ordinary construction except that they are devoid of the usual sets of teeth for cooperation with the full stroke devices and except for further slight changes that will be pointed out. Instead each fan has but a single tooth or stop 181 for purposes which will presently appear. Each fan 180 has a cam 182 that coacts in the usual manner with a universal bar 183 carried by and fixed to the universal shaft 183ᵃ to bring about the preliminary operations of the actuator. Such preliminary operations include the actuation of the master dog 184 through the master cam 185, the withdrawal of the locking dog 186 through an actuation of a crank arm 187 and the establishing of a meshing engagement between the sector 192 and its gear 193. These preliminary operations must be effected before a differential motion is transmitted to the master wheel 188 through one of the goose necks 189 and the usual differential or sector shaft 190 which carries the fixedly connected arms 191 provided with rollers 191ª with which the goose necks coact. Secured to turn with the shaft 190 is the usual toothed segment or sector 192 which also has a lateral movement into and out of mesh with a gear 193 on the shaft 194 to which the master wheel 188 is fixed. As in the usual construction the sector 192 is thrown into mesh with its gear 193 at the first part of the movement of any fan 180 from its normal position and under control of the universal bar 183 by the cam 182 of the actuated fan operating on the latter. The master wheel 188 successively registers and meshes with the different gear wheels 195 in a vertical totalizer, designated as a whole by the reference numeral 196 in Fig. 18, as said totalizer receives a step-by-step movement with the typewriter carriage and moves through the computing zone. There may be any desired number of these vertical totalizers detachably carried by and adjustable on the supporting bar 197. The supporting bar 197 is connected to travel with the typewriter carriage and the usual cross totalizer mechanism (not shown) may be employed, the master wheel therefor being controlled by the differential shaft 190 in the usual manner.

From a consideration of Figs. 19, 30 and 31 it will be understood that the present construction differs from the usual Remington accounting machine in the following respect:

In the usual construction each goose neck 189 is limited in its return movement to the uppermost normal position by the upper end of the arm 189ᵇ thereon contacting with a fixed cross bar 189ᶜ of the actuator frame; the goose necks in such construction being returned to normal position by spring means. In the present construction, however, the goose necks are positively returned to normal position by the action of the cams 12 and always to a definite fixed position. Therefore, there is no necessity for positively arresting the goose necks in their return movements, and in order to avoid this and prevent the noise and possible injury to the parts that might result from positively arresting the goose necks I cut off a part of each of the arms 189ᵇ so that they no longer coact with the bar 189ᶜ. Due to this construction the resilient connection between each arm 144 and its companion link 172, shown in Fig. 8, may if desired, be eliminated and a direct and positive connection between such parts may be employed instead, as hereinbefore indicated.

In the present construction the usual full stroke devices as such are eliminated, inasmuch as there is no necessity for their use in the present construction since the parts are power-driven and are positively returned to normal position by the cams 12. However, parts of the full stroke mechanism are retained to function in the manner of a safety device or lock to prevent an operation of the computing mechanism under certain peculiar conditions of operation, as will presently appear.

It will be seen that the usual teeth ordinarily employed on each fan 180 for cooperation with the full stroke devices are eliminated in the present construction, a single tooth or stop 181 only being employed on the lower edge of each fan 180. This single tooth 181 on each fan is adapted to coact with what ordinarily constitutes one of the two usual full stroke pivoted locking bars, indicated at 198. The bar extends across and coacts with the stop 181 on each fan 180 to lock them all against effective actuation under certain conditions which will presently appear. One end of the locking bar 198 carries the usual upwardly extending crank arm 199, as shown in Fig. 19. The usual crank arm 200 on the universal shaft 183ª coacts with the arm 199 to control the movement of the locking bar 198 out of effective position against the force of its spring 201.

The construction and arrangement of the parts just described are such that when the cam 182 on any actuated fan 180 moving in the direction of the arrow in Fig. 28 reaches and starts to actuate the universal bar 183, the locking bar 198 will be turned to the position shown in said figure, where it will clear the stops 181 on all of the fans. As the actuated fan advances far enough to carry the cam 182 thereon past the universal bar the latter will return to normal position, enabling the locking bar 198 to be pressed by its spring 201 against the smooth edge 180ª on the actuated fan. As soon, however, as the stop 181 passes the locking bar 198 in the return movement of the actuated fan to normal position, as shown in Fig. 29, said locking bar will be forced by its spring 201 into the path of the stops 181 on all of the fans 180.

The purpose of this last described construction can best be understood after the actuator lock for the computing mechanism has first been described and further reference to the function and purpose of the locking bar 198 will therefore be deferred for the time being.

Referring more particularly to Figs. 1, 18, 20 and 21 it will be seen that each fan 180 has the usual cut-out 202 therein to receive adjacent locking projections 203 on the usual locking members 204. Each of said members is pivoted at 205 on fixed supporting bars 206 to receive a slight lateral movement, each terminal member 204ª of the series being fixed by a pin 207 (Fig. 21) to an upstanding arm 208 on one of the supporting bars 206. The extent of lateral motion of the entire series of locking members 204 is just sufficient to enable a single fan 180 to pass between the associated locking projections 203. When, therefore, one fan 180 is actuated all of the remaining fans will be locked against actuation by their associated locking projections 203, and only one fan 180 can be fully actuated at a time, although there may be a slight play or lost motion between each fan and its locking members before a fan is arrested thereby. It is to be observed, however, that in the present construction the locking members 204 do not also lock the numeral printing key levers 130 against depression. Therefore, it is possible at times to depress a key lever 130 to release its trip lever 107, and by a very rapid operation depress a second key lever 130 to release its trip lever 107 before the cycle of operations resulting from the depression of the first mentioned lever 130 has been completed. This is true notwithstanding the rapidity of movement of the parts under control of the power-driven actuating means. This action in certain circumstances might, in the absence of the locking bar 198 and coacting stops 181, result in faulty operation of the parts that would tie up the machine, or result in a failure to actuate the computing mechanism, as will be understood from what follows.

In order to fully appreciate the difficulties that are overcome by the use of the locking bar 198 and stops 181 in the present construction, it is necessary to bear in mind the necessary operations that must take place in the computing mechanism at each complete computing operation before another proper computing operation can be effected. For example, the universal bar 183 must be moved from its normal or zero position, shown in Fig. 18, to the actuated position shown in Fig. 28, by the cam 182 on one of the fans 180 during the initial portion of the forward movement of the latter. This brings about a preliminary operation of certain of the parts including the throwing into mesh of the sector 192 to render it operative, the release of the master dog 186 etc. before the companion goose neck 189 is picked up and actuated to turn the differential shaft 190 and the master wheel 188 controlled thereby. After the actuated cam 182 has passed the universal bar 183, the latter is free to return to the zero or normal position, restoring the parts controlled thereby to normal position. After a computing operation has been effected, the actuated fan in its return movement in the direction of the arrow in Fig. 29 again brings the cam 182 thereon into cooperation with the universal bar 183 and shifts it from the zero position, shown in Fig. 18, to what may be termed the sub-zero position, shown in Fig. 29. This figure shows the condition of the parts in the backward movement of the fan just before the cam 182 has been released from the universal bar to enable the latter to return to the normal or zero position. It will be understood that if another fan 180 is free to be operated at this time, or at any time while the universal bar 183 is held in this sub-zero position, its forwardly moving cam 182 will pass freely under the universal bar without operating the latter. It follows, therefore, that the various parts controlled by the movement of the universal bar from the zero or Fig. 18 position, to the actuated or Fig. 28 position, including the rendering of the sector 192 operative, would not function at this time and the computing mechanism would be inoperative.

In addition to the foregoing it would be possible in certain circumstances to tie up the machine in the event of it being possible to actuate a second fan 180 while the universal bar 183 is in the sub-zero position, shown in Fig. 29. In order to arrive at an understanding of how this might occur reference is made to Figs. 30 and 31 in the following explanation.

Let it be assumed that the operator has actuated the "9" key, and that the uppermost goose neck 189 and its fan 180, shown in Fig. 30, has not quite returned to normal position so that the universal bar 183 is held in the sub-zero position. It will be observed that at this time the universal bar is held in such position that the cam 182 on another advancing fan 180, if permitted to operate, will pass beneath the universal bar without actuating it. Now, if, say, the "1" key is rapidly actuated immediately after the "9" key, and the fan 180 of the "1" key were permitted at this time to move to the lowermost position shown in Fig. 30, then the companion goose neck would be apt to move down back of the associated roller 191a, as shown in this figure, instead of receiving the roller in the slot of the actuated goose neck, as it should under a proper operation. In the meantime the fan 180 of the "9" key and the sector shaft 190 have returned to normal position shown in Fig. 31. This results in carrying the cam 182 of the "9" key from beneath the universal bar 183 and allowing it and the parts controlled thereby to return to normal position. However, from a consideration of the dotted line showing in Fig. 30 it will be seen that at this time the "1" key goose neck has dropped to the lowermost position shown, due to the lost motion or pin and slot connection 189a, 180b, between it and its fan 180; said goose neck is therefore disposed in a position it could never attain when properly coacting with its roller 191a. When, therefore, the "1" key fan 180 attempts to return to normal position the forward portion of its goose neck will be disposed in front of the companion roller 191a as shown in Fig. 31 and will be blocked against return movement and the machine will be tied up and cannot be used until a proper conditioning of the parts has been brought about by removing the cover to gain access to actuator mechanism and restoring the parts to proper position by hand.

I have taken the rapid successive operation of the "9" and "1" keys as examples in pointing out the tying up of the machine as explained above, but it should be understood that an operation of any of the higher value numeral keys followed very rapidly by the operation of one of the lower value keys might result in such tying up of the machine in the absence of the locking bar 198 and the stops 181 of my present invention.

Moreover, the operation of any one of the numeral keys following very rapidly the operation of another of said keys, whatever the order thereof, might result in not operating the computing mechanism by such actuation of the second key, as hereinbefore explained and as shown in Fig. 30, in the event that the locking bar 198 and stops 181 are omitted.

Having described what might result in the absence of the locking bar 198 and stops 181, I will now point out how such devices prevent the false operations referred to.

It has been hereinbefore explained how on the forward movement of any fan 180 from its normal position, the locking bar 198 is automatically shifted to the dotted line position shown in Fig. 30. When, however, the cam 182 on the actuated fan passes the universal bar 183 after having moved it, the locking bar 198 will be automatically returned by its spring 201 so that it will bear against the edge 180a on the actuated fan. As such actuated fan is returned to normal position the locking bar will drop off the edge 180a when the companion stop 181 is reached, as shown in Fig. 30, thereby interposing itself in the path of the stops 181 on all of the fans and blocking a movement of all of them from normal position to an extent which will enable the cams 182 thereon to pass the universal bar 183. The effectiveness of the lock will be maintained until the first actuated fan and goose neck have passed back beyond the position shown in Fig. 30 and have reached the normal position shown in Fig. 18. This releases the universal bar 183 and enables it to return to its normal position shown in Fig. 18. The result of this is that the false operations referred to above cannot take place and the difficulties pointed out are overcome. This will be understood by referring to Fig. 30, when it is explained that due to the use of the locking bar 198 and stops 181, the rapid operation of the "1" key is ineffective to bring about a movement of the companion fan and goose neck to the lowermost position shown in the figure and in Fig. 31, since the locking bar will be in the path of the stop 181 on said fan, as well as the remainder of them, and prevent such a movement of the said parts until the uppermost first actuated fan and goose neck of the "9" key have fully returned to normal position. When this does take place then the parts, including the arms 199 and 200 (Fig. 19), are so conditioned that an operation of any numeral key will result in a proper operation of the parts, the locking bar 198 at this time being automatically thrown out of the path of the stop 181 which is approaching it in the movement of companion fan from normal to the actuated position.

But it may be asked why is it necessary to employ the locking bar 198 and stops 181 when the fan locks 204 are supposed to prevent an actuation of one fan 180 until a previously actuated fan has returned to normal position. The answer is that in certain circumstances, such as have been described above, the locks will not function in the manner stated. This can best be understood from what follows.

Assume that the operator has depressed the "9" key and by a very rapid movement thereafter has depressed the "1" key. The depression of the "9" key resulted in coupling its cam 12 to the power shaft 13. As said cam turns in an anti-clockwise direction, as the parts are shown, its companion arm 144 is lowered under the force of its spring 157. This results in turning the associated fan 180 in an anti-clockwise direction and closing the remainder of the locking members 204 to prevent an actuation of any of the other fans 180 until the one which has been actuated returns substantially to normal position. However, it is not feasible in practice to make the fan locks function so accurately that the first actuated fan and the parts controlled thereby will have returned to normal position under control of the power-actuated means before it is possible to actuate another key. This same operation of the "9" key referred to above resulted in rocking the differential shaft 190 to the limit of its operating movement, all of such operations having taken place while the cam 12 of the first depressed "9" key is turning substantially half a revolution. In the meantime the depression of the "1" key released its trip lever 107 connecting its cam 12 to the power shaft. This ordinarily would result in actuating the corresponding fan 180, but such fan at this time is locked against actuation by the locking members 204 after having moved a very short distance. So, therefore, the companion arm 144 is held suspended in normal position against the force of its spring 157 while the associated cam 12 is revolved bringing a lower portion of it beneath the companion suspended arm. While a lower portion of this cam is still beneath its suspended companion arm 144, the fan of the "9" key will have returned towards but not completed its movement to normal position, it being at this time, in say, the uppermost position shown in Fig. 30. I will say that about this time the lock 204 will be released and permit the fan of the "1" key to pass the lock, it being remembered that the force of the associated spring 157 is being exerted against its companion arm 144 which is held suspended against the force of said spring by the lock. This, in the absence of the locking bar 198 and stops 181 might result in the fan and goose neck of the "1" key making a faulty operation by reaching some such position as is indicated by the lowered goose neck in Fig. 30 and ultimately reaching some such position as is indicated by the lowered goose neck shown in Fig. 31, which will cause a tying up of the machine as has been hereinbefore described. Or it might, in the absence of the locking bar 198 and stops 181, merely result in one of two even adjacent keys operated in rapid succession not bringing about an actuation of the computing mechanism, as previously explained and as indicated in Fig. 30.

It should be understood that the faulty operations pointed out above would not occur, even in the absence of the locking bar 198 and stops 181, if the machine be properly operated by an experienced operator, but might occur occasionally under certain conditions of use, which have been explained, by an inexperienced operator. However, by the employment of the locking bar 198 and stops 181 it is impossible to bring about the faulty operations referred to irrespective of the conditions and manner of operating the numeral keys.

From what has been pointed out it will be understood that the effect of employing the locking bar 198 and stops 181 is that said bar will function to lock any fan 180 against effective actuation only in the event that its associated numeral key is actuated very rapidly after the previous actuation of a numeral key and before the goose neck 189 and fan 180 of the first actuated key has had an opportunity to return to normal position, and such locking bar will be conditioned to be automatically thrown out of locking position as hereinbefore described during the advance of a third fan when the cam of the second depressed numeral key returns to normal position.

The result of the foregoing construction is to render it impossible for one goose neck to be projected back of the companion roller 191ª in the return movement of the differential shaft 190 and thereby prevent a tying up of the machine, and it is impossible to bring about any other faulty operation of the parts such as has been pointed out by the manipulation of the numeral keys.

I will now proceed to describe the means whereby the computing mechanism and numeral printing mechanism are rendered ineffective, or are locked against actuation, in the event that the tabulator mechanism is operated and also when the carriage is being returned by its power-actuated return mechanism.

From an inspection of Figs. 1, 17, 20 and 22 it will be seen that the driving belt 22 (Fig. 17) transmits power from the motor-driven pulley 21 to a pulley 23. This last mentioned pulley is adapted to be connected with the carriage-return mechanism shown in detail in my hereinbefore mentioned application, and sufficient of which is shown herein to arrive at an understanding of features of the present invention in combination therewith. The pulley 23 is fixed on a shaft 209 mounted in a bearing in one of the rear corner posts of the frame 1. The shaft 209 carries a clutch member 210 fixed to turn therewith but free to slide thereon by the pins 211 fixed to the shaft and received in slots 212 in the clutch member. The clutch member 210 by its sliding movement on the shaft 209 is thrown into and out of engagement with a second clutch member (not shown) mounted on a second shaft that carries a worm pinion 213 shown in dotted lines in Fig. 22. This pinion meshes with a worm wheel 214 loosely mounted on a vertically disposed shaft 215. The worm gear 214 carries a clutch section 216 with which a sliding clutch section 217 coacts. The section 217 is fixed to turn with but is free to slide along the shaft 215 into and out of clutching engagement with its companion clutch section 216. The sliding clutch section 210 is controlled by a clutch shifting angular lever 218, whereas the sliding clutch section 217 is controlled by a clutch shifting arm 219. One arm of the angular lever 218 is operatively connected to a crank arm 220 fixed on the usual main control shaft 221. The arm 219 also is fixed on said control shaft so that a rocking of the shaft clockwise closes both clutches, and a rocking of the control shaft in the opposite direction opens both clutches. The upright shaft 215 is in geared connection with the carriage so that when both clutches described above are closed by a rocking of the control shaft 221 the carriage will be returned. The control of the shaft 221 is effected in the usual manner employed in the No. 23 Remington accounting machine and substantially as indicated in my Patent No. 1,567,590 dated December 29, 1925 and includes a releasing hook 222, a cooperative releasable holding latch 223 and an arm 224 with which said latch coacts. The arm 224 is connected with and controls the rocking of control shaft 221 to clutch opening and closing positions.

A depending arm 225 fixed on the control shaft 221 is forked at its lower end 226 to straddle a push rod 227 that carries a nut 228 thereon to provide an adjustable abutment with which the fork 226 coacts in its forward movement. A second nut 229 is threaded onto the rod 227 and constitutes an adjustable abutment with which the upper forked end 230 of a crank arm 231 coacts in its forward movement. The push rod 227 extends forward as shown in Fig. 1 where it makes connection at its forward end with the depending arm of a bell crank lever 232 pivoted on the rod 170. The forwardly projecting arm of the bell crank lever 232 is pivoted to the lower end of a link 233, the upper end portion of which is in the nature of a locking blade 234. As shown in Fig. 20 this locking blade is situated and guided between the two supporting bars 206 for up and down sliding movement and is located between two adjacent locking members 204. The upper beveled end of the locking blade when the latter is raised into effective position coacts with the under beveled edges on the projections 203 of the two associated locking members 204. The effect of this is to cam said members to right and left and close all of the spaces between them, it being understood that the thickness of the blade 234 corresponds to the thickness of each of the fans 180. It follows, therefore, that all of the locking members 204 are locked against lateral movement and will lock all of the fans 180 and the parts controlled thereby against actuation until the locking blade is again withdrawn to the Fig. 20 position.

This locking blade 234 is shifted to effective position when a tabulator key is actuated, and also when the power-actuated carriage-return mechanism is rendered operative. Therefore, in either of these circumstances the computing mechanism will be locked against actuation, and since the numeral printing mechanism is dependent for its operation on a prior actuation of the computing mechanism, it follows that the numeral printing mechanism as well is rendered ineffective in either of the circumstances referred to. This locked condition is maintained until either the tabulating operation or the carriage-return movement has been completed and the parts are again restored to a normal condition, when the blade 234 will be withdrawn and the locking members 204 will be released, all as will hereinafter more clearly appear.

It has been hereinbefore pointed out that when the control shaft 221 receives a clockwise movement from its normal position shown in Fig. 22 as the carriage reaches the end of a line, this will result in closing the two clutches, thus connecting the carriage to its power-driven returning means. This movement of the control shaft also results in moving the crank arm 225 on said shaft forward, and in effecting a forward movement of the push rod or link 227 to elevate the locking blade 234 and lock the computing mechanism etc. against operation. When the control shaft is rocked back to the normal, Fig. 22, position at the completion of the return movement of the carriage, the locking blade 234 will be withdrawn to the ineffective, Fig. 20, position by the reactive force of a suitable returning spring in the train of connection, such as the spring 235 (see Fig. 1) connected at one end to the lever 232 and at its other end to the cross bar 236 on the frame I.

The locking blade 234 is controlled from the tabulator mechanism by the following means:

The crank arm 231 (Fig. 22) hereinbefore referred to, is fixed to a rock-shaft 237 that carries a depending crank arm 238 bifurcated at its lower end to straddle a pin 239 carried by a crank arm 240 fixed to a rock shaft 241 which extends across the machine and is mounted at its ends in the base of the upper frame I, the rock shaft 237 being mounted in a like manner. A second arm 242 is fixed on the rock shaft 241 and is connected at its rear end to an upwardly extending link 243. A third arm 244 is fixed on the shaft 241 and is connected to an upwardly extending link 245. A rearwardly and upwardly projecting branch 246 on this link is adjustably connected with the aid of a pivoted device 247 and screws 248 with a carriage releasing device 249 pivoted at 250 and carrying a rack lifting shoe 251. The shoe 251 extends beneath the usual carriage feed rack 252 pivoted at 253 on the carriage and when said shoe is lifted, as shown in Fig. 22, the feed rack is elevated thus disengaging it from the feed pinion 254. This frees the carriage to travel from right to left under the propulsion of the usual spring drum (not shown) until the carriage is arrested by the cooperation of certain of the tabulator stops, as will now be explained.

Each of the tabulator keys 255, shown in Fig. 1, is carried by a bell crank key lever 256 pivoted to a push link 257. As shown in Fig. 22 the rear end of each of these push links 257 is connected to and supported by an upright lever 258 fulcrumed at its lower end at 259 and cooperative at its upper end with a slide 260. The slides 260 are supported for individual fore and aft sliding movement on two supporting rods 261 and each coacts at its rear end with the lower end of a denomination stop lever 262 pivoted intermediate its ends at 263 on the usual tabulator frame. The upper end of each lever 262 extends forward to provide a denominational stop 264 adapted to be projected forward into the path of the first oncoming column stop 265 on the carriage when the associated key 255 is depressed. On the release of said key after the carriage has been arrested by the projected denominational stop, the depressed key and the parts connected therewith will be returned to normal position by the associated return spring 266.

The manner in which an actuation of any one of the tabulator keys 255 will not only result in moving the locking blade 234 to effective position, thereby locking the computer mechanism against operation as previously described, but will also insure a release of the clutches through which a carriage-return is effected will now be described.

From a consideration of Fig. 22 it will be seen that a universal bar 267 extends in the rear of the denominational stop levers 262 below the pivot 263 thereof. This universal bar is formed as a part of a frame 268 pivoted at 269 and is provided with a forwardly extending arm 270. The forward end of this arm carries a headed pin 271 that is received in a slot 272 in the upper end of the link 243 hereinbefore referred to.

From what has been pointed out it will be understood that the depression of a tabulator key not only will result in projecting the associated denominational stop 264 into the path of the first oncoming column stop 265, as shown in Fig. 22, but also will result in rocking the frame 268 to the position shown in this figure. The effect of this is to move the link 243 down and rock the shaft 241 through the connection of said link with the arm 242 on said rock shaft. This rocking of the shaft 241 also results in carrying the link 245 down and releasing the carriage for tabulating movement and likewise results in rocking the arm 238, the shaft 237 and arm 231 to the Fig. 22 position. The effect of this movement is to transmit a forward movement to the push rod 227, thus moving the locking blade 234 up to locking position, thereby preventing an operation of the computing mechanism until the carriage has completed its tabulator run and the tabulator mechanism has been returned to normal position.

In addition to the foregoing it is desirable to insure the release of the clutches by which the carriage-return mechanism is rendered effective, if for any reason the clutches should be engaged when the tabulator is actuated and the computing mechanism is locked. To attain this end I provide the pull link 245 (Fig. 22) with a trip member 273 fixedly but adjustably secured on the link 245 by screws 274. The upper end of this member 273 is provided with a laterally extending lug 275 that overlies the clutch controlling arm 219, and as the link 245 moves down to the Fig. 22 position it will carry said arm with it, if for any reason said arm 219 should be in the elevated position. The result of pulling down the arm 219 as described, should it be in the elevated position, is to separate the clutch section 217 from its companion clutch section 216. The movement of the arm 219 in the manner described also results in rocking the control shaft 221 and this causes the clutch section 210 to be moved to the clutch releasing position.

The movement of the control shaft 221 in the manner just described has no effect on the locking blade 234, or in its movement to effective position at this time, since the rearward movement of the arm 225 would merely result in carrying its forked end 226 away from the abutment 228 while the push rod 227 is moved forward and held in such position by the members 243, 242, 241, 240, 238, 237, 231.

In practice I prefer to employ two catches or supporting members 276 as shown in Fig. 23 for holding the upper frame section 1 in its thrown back position on the lower or base section 2. One of these catches is employed on each side of the machine and each is pivoted at its upper end to the frame 1, as indicated at 277. Each catch is slotted longitudinally thereof, as indicated at 278, to receive a headed pin 279 that projects inward from a side wall of the base frame 2. The lower end of each slot 278 registers with a laterally extending locking slot 280, so that when the parts are in the position shown in Fig. 23 the upper frame 1 will be supported and held by the catches in the elevated position. To release the catches, it is merely necessary to shift the lower ends thereof forward to bring the longitudinal slots in register with the pins 279, possibly relieving the pressure of the frame 1 on the catches while they are being thus released. The catches will automatically lock when the frame 1 is shifted up to the position shown in Fig. 23.

It is thought that a clear understanding of the operation of the various parts of the construction will be arrived at from the foregoing description. However, a brief description of the operation of some of the parts will be given below and stress laid on some of the features in connection therewith.

The depression of a numeral key 130ᵃ will, as previously pointed out, result in moving its companion lever 107 to releasing position. This results in coupling the companion cam 12 to its driving shaft 13, but before the cam in question can make a complete revolution the actuated lever 107 will be restored to normal position ready to release the companion locking pawl 102 at about the time the operating cam has made a revolution, thereby disconnecting such cam from its power shaft. This operation will take place even though the operator holds the actuated numeral key depressed. The revolution of the cam just described resulted in lowering the associated arm 144 under the force of the companion spring 157 to operate the computing mechanism. If for any reason, such as has been hereinbefore pointed out, the operation of the computing mechanism is blocked then the arm 144 will be merely suspended and held against operating movement until such time as the blocking of the computing mechanism is released. If this occurs while a low portion of the operating cam is beneath its suspended arm 144 then the latter will be snapped down against its cam and operate the computing mechanism, the arm being restored to normal position as the high portion of the operating cam returns to normal position. If on the other hand the operating cam completes its revolution before the blocked arm 144 is released neither a computing or printing operation will have been effected.

By reason of the fact that the printing of a numeral does not take place until after the companion arm 144 has been lowered to its lowermost position and actuated the computing mechanism, and thereafter is being positively returned by its cam to normal position, it follows that a printing cannot possibly be effected until the computing mechanism has been actuated, and properly actuated due to the locking bar 198 and stops 181. This is an important factor because no matter what the speed of operation, the printing cannot take place until after the completion of the computing operation and if the latter is not effected no printing can take place. If for any reason the operation of the arm 144 is blocked, no printing will take place. The operator will immediately discover this fact and will know that therefore no stepping of the carriage has taken place and that no operation of the computing mechanism has been effected.

Notwithstanding the fact that the computing mechanism is actuated under the force of the springs 157, and that, therefore, the machine cannot be broken in the event of the computing mechanism becoming blocked against operation for any reason, each numeral printing type bar is nevertheless positively actuated and through an operation of the same member 144 by which the corresponding computing operation takes place but in the return movement of said member to normal position.

The dip of the numeral printing keys in the present instance is about a quarter of an inch and the only work they have to perform is to move the trip levers 107 to releasing position, all other work of operating the computing mechanism and operating the numeral printing mechanism being effected by power. The only work that the alphabet keys have to perform is to move the actuating pawls 65 into the path of the teeth in the snatch roll 9 all other and further operations being effected by power.

From the foregoing description it will be understood the entire Wahl computing mechanism and the type actions, carriage feed mechanism, ribbon control mechanism etc. of the Remington machine may be employed in the present construction with but few changes in the existing structural features thereof.

In order that the value of various features of the present invention may be more fully appreciated, the following facts should be taken into consideration.

It is desirable in the production of a successful power-actuated combined typewriting and computing machine that the maximum of speed be attained with the minimum amount of wear and tear, and, nevertheless, the operation of the various parts in accurate timed relation is an essential factor. It also is highly desirable, if not essential to the production of a successful power-actuated machine, that the computing mechanism be actuated by a harmonic motion, whereas on the other hand, printing instrumentalities of the character employed herein require an accelerated movement generated by a positively applied force. Therefore, a cam having the correct characteristics for actuating a printing instrumentality or type bar would not be available for and possibly would be destructive in its action if employed to positively actuate the computing mechanism. While the proper timing in the harmonic operation of the computing mechanism under a maximum speed of operation is necessary, it is desirable that such operation should not be effected through a positively applied force since an error of adjustment in the machine might result in serious injury thereto. Moreover, it is desirable that no imprint on the paper be effected unless the computing mechanism has been properly and completely actuated. Otherwise, the operation of the machine might at any time and repeatedly result in delivering or setting up inaccurate calculations while correctly printing the items.

By the present invention all of the foregoing difficulties are overcome and the desirable ends specified are attained. Thus, by separating or regulating the computing and printing operations to take place successively under control of the cams 12, I am enabled not only to attain a harmonic operation of the computing mechanism by the force of spring means under the permissive action or control of the cams, but also render it necessary that such operation of the computing mechanism be completed before the type action can be picked up and positively actuated with an accelerated movement in each instance by the further operation of the same cam by which the computing mechanism was actuated. Therefore, it will be understood that unless the computing operation has first been completed, the printing mechanism controlled by the operation of the actuated numeral key will not function to print the item and the carriage will not be advanced. These features, therefore, constitute important factors in the production of a highly effective machine which is sturdy in construction, is very rapid, reliable and accurate in its operation; is not apt to be deranged or broken in use; is comparatively simple in its constructon and easy to assemble, and is therefore comparatively cheap to manufacture.

Various changes may be made in the construction, and parts thereof may be employed without others, without departing from my invention as it is defined in the accompanying claims.

What I claim as new and desire to secure by Letters Patent, is:—

1. The combination of computing mechanism, printing mechanism, and power-actuated controlling means for said computing and printing mechanisms, comprising a series of key selected actuating members each movable from and back to normal position, spring means for moving each of said members in one direction, power-actuated means for positively moving each of said members in the opposite direction against the force of its spring means, means for actuating the computing mechanism by an actuation of each of said members by its spring means, and means for operating the printing mechanism by the movement of each of said members in the opposite direction under the operation of its power-actuated means.

2. The combination of computing mechanism, printing mechanism, and power-actuated controlling means for said computing and printing mechanisms, comprising a series of key selected actuating members each movable from and back to normal position, spring means for moving each of said members from normal position, power-actuated means for positively returning each of said actuating members to normal position against the force of said spring means, operative connections between said actuating members and the computing mechanism for actuating the latter on the movement of any of said members from normal position under the force of said spring means, and operative connections between each of said actuating members and said printing mechanism that are effective on the latter only during the return movement of an actuating member to normal position under the force positively exerted thereon.

3. The combination of computing mechanism, printing mechanism, and power-actuated controlling means for said computing and printing mechanisms, comprising a series of key selected actuating members each movable from and back to normal position, spring means for moving each of said members from normal position, power-actuated cam means associated with said actuating members to afford a movement thereof from normal position under the force of the spring means thereon and for positively returning said members to normal position against the force of said spring means, operative connections between said actuating members and said computing mechanism for actuating the latter on the movement of said members from normal position under the operation of said spring means thereon, and operative connections between the actuating members and the printing mechanism operative on the latter only during the return of said members to normal position under the positive force of the cam means thereon.

4. The combination of computing mechanism, printing mechanism, and power-actuated controlling means for said computing and printing mechanisms, comprising a series of key selected actuating members each movable from and back to normal position, spring means for moving each of said members from normal position, a series of cams cooperative with said actuating members to afford movement of each of said actuating members from normal position under the force of their spring means and for positively returning said actuating members to normal position against the force of said spring means, a power-driven member, key-controlled means for connecting each of said cams to move therewith, operative connections between each of said actuating members and the computing mechanism to actuate the latter during the movement of said actuating members from normal position under the force of said spring means, and operative connections between each of said actuating members and said printing mechanism for positively actuating the latter only during the return of said actuating members to normal position under the positively applied force of said cams.

5. The combination of computing mechanism, type bars, and key-controlled power-actuated mechanism for selectively actuating said computing mechanism and type bars, comprising a series of keys, oscillating actuating members each movable from and back to normal position at each operation of the associated key, a spring for each actuating member and exerting its force to move the associated actuating member from normal position, operative connections between each actuating member and the computing mechanism for actuating the latter by a movement of an actuating member from normal position under the force of its spring, a series of independently operable cams associated with said actuating members and controlling their movements from and back to normal position and positively returning them to normal position against the force of their springs, a rotative driving member, means controlled by each of said keys for connecting the associated cam to make one complete revolution with said driving member at each operation of a key, and operative connections between each of said actuating members and the associated type bar to operate the latter only during the return of its actuating member to normal position under the positive force exerted thereon by the associated cam.

6. The combination of computing mechanism, type bars, and key-controlled power-actuated means for selectively actuating said computing mechanism and type bars, comprising oscillating actuating members movable from and back to normal position, spring means for moving said actuating members from normal position, motor-driven means for controlling the movement of said actuating members from normal position under the action of their spring means and for positively returning said members to normal position against the force of such spring means, means controlled by the movements of said actuating members from normal position under the force of their spring means for actuating the computing mechanism, a series of levers operatively connected to the type bars, and trip devices intermediate said actuating members and levers and operative to move the latter and actuate the type bars only during the return of the actuating members to normal position under the positively applied force of said motor-driven means.

7. In a combined typewriting and computing machine, the combination of computing mechanism, numeral printing type bars, and key-controlled power-actuated means for selectively operating said computing mechanism and type bars including power controlled oscillating members, and means for actuating the computing mechanism by a movement of each of said members in one direction and for actuating one of said numeral printing type bars by a return movement of each of said members in the opposite direction.

8. In a combined typewriting and computing machine, the combination of computing mechanism, numeral printing type bars, and key-controlled power-actuated means for selectively operating said computing mechanism and type bars including power-controlled actuating members movable from and back to normal position, means for actuating the computing mechanism by a movement of each of said actuating members from normal position and while it is disconnected from said type bars, and automatically operating means for operatively connecting each of said type bars to and for actuating it by the associated actuating member during the return movement of the latter to normal position.

9. In a combined typewriting and computing machine, the combination of computing mechanism, numeral printing type bars, and key-controlled power-actuated means for selectively operating said computing mechanism and type bars including actuating members movable from and back to normal position, a spring for moving each of said actuating members from normal position and while it is ineffective to actuate any of said type bars, motor-driven means acting positively on each of said actuating members to return it to normal position against the force of its spring, means for operating the computing mechanism by a movement of any of said actuating members from normal position under the force of its spring, and means for operatively connecting and actuating each of said type bars to its associated actuating member during the return movement of the latter to normal position under the operation of motor-driven means.

10. The combination of computing mechanism, printing mechanism, and power-actuated controlling means for said computing and printing mechanisms comprising a series of key selected actuating members each movable from and back to normal position, spring means for moving each of said members in one direction, power-actuated means for positively moving each of said members in the opposite direction against the force of its spring means, means for actuating the computing mechanism by an actuation of each of said members by its spring means and including a cushion or resilient connection between each actuating member and the computing mechanism, and means for operating the printing mechanism by the movement of each of said members back to normal position under the operation of its power-actuated means.

11. The combination of computing mechanism, printing mechanism, and power-actuated controlling means for said computing and printing mechanisms comprising a series of key selected actuating members each movable from and back to normal position, spring means for moving each of said members from normal position, power-actuated cam means associated with said actuating members to afford a movement thereof from normal position under the force of the spring means thereon and for positively returning said members to normal position against the force of said spring means, operative connections between said actuating members and said computing mechanism for actuating the latter on the movement of said members from normal position under the operation of said spring means thereon, each of said operative connections including cushioning means that enable them to yield during the return of each of said members by its cam, and operative connections between the actuating members and the printing mechanism operative on the latter only during the return of said members to normal position under the positive force of the cam means thereon.

12. In a combined typewriting and computing machine, the combination of computing mechanism, numeral printing type bars, and key-controlled power-actuated means for selectively operating said computing mechanism and type bars including power-controlled oscillating members, and means for actuating the computing mechanism by a movement of each of said members in one direction and for actuating one of said numeral printing type bars by a return movement of each of said members in the opposite direction, said last mentioned means including cushioning or resilient means between each oscillating member and the computing mechanism that enables the connections to give during the return of each oscillating member to normal position.

13. The combination of computing mechanism, and key-controlled power-actuated mechanism for operating the same comprising actuating members movable from and back to normal position, spring means for moving said actuating members from normal position, motor-driven positively acting means for returning said actuating members to normal position, and means for operating the computing mechanism during the movement of said actuating members from normal position including yielding connections that are adapted to yield during the return of said actuating members to normal position under the action of said motor-driven positively acting means thereon.

14. The combination of computing mechanism, printing instrumentalities, and key-controlled power-actuated mechanism for operating said computing mechanism and printing instrumentalities comprising actuating members movable from and back to normal position, spring means for moving said actuating members from normal position, motor-driven positively acting means for returning said actuating members to normal position, means for operating the computing mechanism during the movement of said actuating members from normal position, the actuating members being disconnected from and ineffective on said printing instrumentalities at such time, and automatically operating means for operatively connecting said printing instrumentalities with said actuating members for operation thereby only during the return movement of said actuating members to normal position.

15. The combination of computing mechanism, type bars, a constantly running motor-driven shaft, individually movable cams loosely mounted on said shaft, key-controlled means for operatively and selectively connecting each of said cams to make a single revolution only with said shaft at each actuation of the associated key, a series of actuating arms controlled by said cams, constantly maintained connections between said actuating arms and the computing mechanism, and separate connecting means between the arms and said type bars that are effective to actuate the latter only during the return of the actuating arms to normal position under the action of the cams thereon.

16. The combination of computing mechanism, type bars, a constantly running motor-driven shaft, individually movable cams loosely mounted on said shaft, key-controlled means for operatively and selectively connecting each of said cams to make a single revolution only with said shaft at each actuation of the associated key, a series of actuating arms controlled by said cams, a spindle or shaft on which arms are mounted to oscillate from and back to normal position, a series of springs on said shaft, one for each of said arms and exerting its force to move the associated arm from normal position under control of its cam, each cam operating positively on the associated actuating arm to return it to normal position against the force of its spring, operating connections between each of said arms and the computing mechanism to actuate the latter by the spring force applied to the arms, and intermediate connections between each of said actuating arms and the associated type bar including a one-way operating device effective to actuate its type bar only during the return of the associated actuating arm to normal position under the force of its cam.

17. The combination of computing mechanism, actuating devices therefor including actuating arms, springs for moving said arms to actuate the computing mechanism, cams which control the movements of said arms under the force of the spring pressure applied thereto, a constantly running power-driven shaft, a latch on each cam for locking it to turn with said shaft, a spring for each latch which tends to move it to locking position, a trip lever coacting with each latch to normally hold it against the force of its spring in releasing position, the reactive force of each latch spring when its associated latch is held released tending to turn the companion cam from its normal position, and a high spot on each cam which in the normal position of the parts causes the effective force of the spring of the associated actuating arm to overcome the reactive force of the companion latch spring and hold the associated cam against displacement thereby.

18. The combination of two distinct power-driven mechanisms one for the numeral printing type actions and computing mechanism and the other for the alphabet printing type action, two relatively movable frame sections arranged one above the other and having a hinged connection, the lower section carrying said power-driven mechanisms, the upper frame section carrying computing mechanism, numeral printing type actions and alphabet printing type actions, the parts being so constructed and arranged that when the upper frame section is lowered to proper position on the lower section the parts will be properly correlated so that the computing mechanism and numeral printing type actions will be under control of one of said power-driven mechanisms and the alphabet printing type actions will be under control of the other of said power-driven mechanisms.

19. The combination of computing mechanism, printing mechanism, oscillatory actuating members, spring means for moving said actuating members in one direction, power-driven cams for moving said actuating members in the opposite direction against the force of said spring means, means by which the computing mechanism is actuated by said actuating members under the movement thereof effected by said springs, and means for effecting a printing operation by the return of said actuating members by said cams.

20. The combination of computing mechanism, printing mechanism, oscillatory actuating members, spring means for moving said actuating members in one direction, power-driven cams for moving said actuating members in the opposite direction against the force of said spring means, means by which the computing mechanism is actuated by said actuating members under the movement thereof effected by said springs, means for effecting a printing operation by the return of said actuating members by said cams, power-driven carriage-return mechanism, locking means for locking said actuating members against movement from normal position, and means under control of said carriage-return mechanism for rendering said locking means effective.

21. The combination of computing mechanism, actuating means therefor comprising a power-actuated cam, an arm controlled thereby for actuating the computing mechanism, a link intermediate said arm and the computing mechanism for transmitting movement from the former to the latter, and cushioning means coacting with said link to render it resilient in its action in one direction under action of said cam.

22. The combination of computing mechanism, actuating means therefor comprising a power-driven shaft, a series of cams, key-operated means for selectively coupling said cams to turn with said shaft, a series of actuating arms controlled by said cams, links intermediate said arms and the computing mechanism, and cushioning means coacting with each of said links to render it resilient in its action in one direction under the action of the associated cam.

23. The combination of computing mechanism, actuating means therefor comprising a power-driven shaft, a series of cams, key-operated means for selectively coupling said cams to turn with said shaft, a series of actuating arms controlling by said cams, springs which tend to move said arms in one direction to operate the computing mechanism, the cams moving said arms in the opposite direction against the force of such springs, links intermediate said arms and the computing mechanism, and cushioning means that coact with said links and that are effective during the return of the arms under the action of the cam thereon and are ineffective during the operating movement of said arms by their springs.

FREDERICK A. HART.